US011159957B2

(12) United States Patent
Morita et al.

(10) Patent No.: US 11,159,957 B2
(45) Date of Patent: Oct. 26, 2021

(54) BASE STATION APPARATUS, SERVICE PROVISION METHOD, AND PROGRAM

(71) Applicant: NEC CORPORATION, Tokyo (JP)

(72) Inventors: Motoki Morita, Tokyo (JP); Daisuke Ohta, Tokyo (JP); Takahiro Nobukiyo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/961,763

(22) PCT Filed: Jan. 17, 2019

(86) PCT No.: PCT/JP2019/001273
§ 371 (c)(1),
(2) Date: Jul. 13, 2020

(87) PCT Pub. No.: WO2019/142863
PCT Pub. Date: Jul. 25, 2019

(65) Prior Publication Data
US 2021/0067980 A1     Mar. 4, 2021

(30) Foreign Application Priority Data

Jan. 19, 2018 (JP) .............................. JP2018-007317

(51) Int. Cl.
*H04W 16/28* (2009.01)
*H04B 7/0413* (2017.01)
*H04W 24/08* (2009.01)

(52) U.S. Cl.
CPC .......... *H04W 16/28* (2013.01); *H04B 7/0413* (2013.01); *H04W 24/08* (2013.01)

(58) Field of Classification Search
CPC ..... H04W 16/28; H04W 24/08; H04B 7/0413
(Continued)

(56) References Cited

U.S. PATENT DOCUMENTS 9,461,903 B2    10/2016 Kojima
9,538,439 B2    1/2017 Pica et al.
(Continued)

FOREIGN PATENT DOCUMENTS

JP    2008-530956 A    8/2008
JP    2010-239303 A    10/2010
(Continued)

OTHER PUBLICATIONS

International Search Report for PCT/JP2019/001273 dated Mar. 26, 2019 [PCT/ISA/210].
(Continued)

*Primary Examiner* — Hirdepal Singh
(74) *Attorney, Agent, or Firm* — Sughrue Mion, PLLC

(57) ABSTRACT

A base station apparatus is connected to a plurality of transmission/reception points each switching a transmission scheme according to reception environment of wireless terminal and providing service to wireless terminal. The base station apparatus includes a history recording part recording history of beam and transmission scheme selected by wireless terminal with respect to each transmission/reception point; a calculation part calculating a second throughput when service is received using one or more beams being candidates for selection by wireless terminal among beams transmitted by a second transmission/reception point different from a first transmission/reception point connected to wireless terminal; and a transmission/reception point selection part providing service from the second transmission/reception point to wireless terminal by the beam and the transmission scheme corresponding to the second throughput subject to satisfying a predetermined condition with respect to the first throughput being the measured throughput with the first transmission/reception point connected to wireless terminal.

20 Claims, 25 Drawing Sheets

(58) Field of Classification Search
USPC .......................................................... 455/450
See application file for complete search history.

(56) References Cited

U.S. PATENT DOCUMENTS

| | | | |
|---|---|---|---|
| 10,523,280 B2* | 12/2019 | Byun | H04W 72/048 |
| 2006/0264184 A1 | 11/2006 | Li et al. | |
| 2014/0289313 A1 | 9/2014 | Kojima | |
| 2014/0334318 A1 | 11/2014 | Pica et al. | |
| 2015/0249929 A1 | 9/2015 | Irie et al. | |
| 2017/0094531 A1 | 3/2017 | Kakishima et al. | |
| 2020/0145079 A1* | 5/2020 | Marinier | H04B 7/0456 |
| 2020/0221319 A1* | 7/2020 | Kang | H04W 72/046 |
| 2020/0229203 A1* | 7/2020 | Hiramatsu | H04B 7/155 |
| 2020/0304256 A1* | 9/2020 | Park | H04L 5/0048 |

FOREIGN PATENT DOCUMENTS

| | | |
|---|---|---|
| JP | 2014-183563 A | 9/2014 |
| JP | 2015-115667 A | 6/2015 |
| JP | 2015-164271 A | 9/2015 |
| JP | 2016-521519 A | 7/2016 |
| JP | 6121931 B2 | 4/2017 |
| WO | 2017/094636 A1 | 6/2017 |

OTHER PUBLICATIONS

Harada et al., "Method overview and experimental results of Super 3G (LTE)", NTT Technical Journal, 2008, pp. 15-21, vol. 20, No. 11. Not in English Language.
International Search Report for PCT/JP2019/001273 dated Mar. 26, 2019.

* cited by examiner

FIG. 4

TRP#1

| TRANSMISSION SCHEME | MEASURED THROUGHPUT |
|---|---|
| SISO BY BEAM 7 | $C_{7\_1}, C_{7\_2}, \ldots C_{7\_N}$ |
| MIMO BY BEAMS 8 AND 9 | $C_{8,9\_1}, C_{8,9\_2}, \ldots C_{8,9\_N}$ |
| ... | ... |

•••••

TRP#N

| TRANSMISSION SCHEME | MEASURED THROUGHPUT |
|---|---|
| MIMO BY BEAMS X1 AND X2 | $C_{X1,X2\_1}, C_{X1,X2\_2}, \ldots C_{X1,X2\_N}$ |
| SISO BY BEAM X4 | $C_{X4\_1}, C_{X4\_2}, \ldots C_{X4\_N}$ |
| ... | ... |

FIG. 5

TRP#2

| TRANSMISSION SCHEME | PREDICTED THROUGHPUT |
|---|---|
| MIMO BY BEAM 22 AND BEAM 23 | $C'_{22,23}$ |
| SISO BY BEAM 22 | $C'_{22}$ |
| ⋮ | ⋮ |
| ⋮ | ⋮ |

FIG. 6

TRP#2

| TRANSMISSION SCHEME | PREDICTED THROUGHPUT | PROBABILITY |
|---|---|---|
| MIMO BY BEAM 22 and BEAM 23 | $c'_{22,23}$ | 0.9 |
| SISO BY BEAM 22 | $c'_{22}$ | 0.1 |
| ... | ... | |
| ... | ... | |

FIG. 11

TRP#2

| TRANSMISSION SCHEME | PREDICTED THROUGHPUT | PROBABILITY |
|---|---|---|
| MIMO BY BEAM 22 AND BEAM 23 | $F_2(R_{22}, R_{23}, N_{22}, N_{23})$ | 0.9 |
| SISO BY BEAM 22 | $F_1(R_{22}, N_{22})$ | 0.1 |
| ... | ... | |
| ... | ... | |

FIG. 14

TRP#1

| TRANSMISSION SCHEME | MEASURED THROUGHPUT | IMMEDIATELY PRECEDING TRANSMISSION SCHEME |
|---|---|---|
| SISO BY BEAM 7 | $C_{7\_1}, C_{7\_2}, \ldots C_{7\_N}$ | MIMO BY BEAMS 5 AND 6 |
| SISO BY BEAM 7 | $C_{7\_1}, C_{7\_2}, \ldots C_{7\_N}$ | SISO BY BEAM 8 |
| SISO BY BEAM 7 | $C_{7\_1}, C_{7\_2}, \ldots C_{7\_N}$ | SISO BY BEAM 9 |
| ... | ... | ... |

• • • • •

TRP#N

| TRANSMISSION SCHEME | MEASURED THROUGHPUT | IMMEDIATELY PRECEDING TRANSMISSION SCHEME |
|---|---|---|
| MIMO BY BEAMS X1 AND X2 | $C_{X1,X2\_1}, C_{X1,X2\_2}, \ldots C_{X1,X2\_N}$ | MIMO BY BEAMS X5 AND X6 |
| MIMO BY BEAMS X1 AND X2 | $C_{X1,X2\_1}, C_{X1,X2\_2}, \ldots C_{X1,X2\_N}$ | SISO BY BEAM X0 |
| ... | ... | ... |

FIG. 15

TRP#2

| TRANSMISSION SCHEME | PREDICTED THROUGHPUT | IMMEDIATELY PRECEDING TRANSMISSION SCHEME |
|---|---|---|
| SISO BY BEAM 24 | $C'_{24\_1}$ | SISO BY BEAM #22 |
| SISO BY BEAM 24 | $C'_{24\_2}$ | SISO BY BEAM #25 |
| ⋮ | ⋮ | |
| ⋮ | ⋮ | |

BASE STATION APPARATUS, SERVICE PROVISION METHOD, AND PROGRAM

REFERENCE TO RELATED APPLICATION

This application is a National Stage of International Application No. PCT/JP2019/001273 filed Jan. 17, 2019, claiming priority based on Japanese Patent Application No. 2018-007317 filed Jan. 19, 2018. The present invention relates to a base station apparatus, a service provision method, and a program.

BACKGROUND

In recent years, data traffic of mobile communication has been rapidly increasing due to the spread of smartphones and tablet terminals and the spread of services involving large-capacity data exchange such as video viewing. As a countermeasure, attention has been paid to a method of utilizing a high frequency band of 28 GHz or more in addition to the conventional 6 GHz band or less. By utilizing the high frequency band, the bandwidth can be expanded from several hundred MHz to several GHz, so that a large capacity can be expected to be achieved.

However, the high frequency band has a radio wave attenuation greater than that of the low frequency band. In order to compensate for this steep attenuation, a Massive MIMO (Multiple Input Multiple Output) beamforming is implemented in a base station having a large number of antenna elements (see PATENT LITERATURE (PTL) 1). The Massive MIMO beamforming is a technique for forming a beam having a high signal strength in a specific direction by superposing radio waves from each antenna element after adjusting the amplitude and phase of the radio waves. Since a large number of narrow-range beams having high beam gains can be formed by the Massive MIMO beamforming, attenuation of radio waves can be compensated by utilizing the beams.

As described above, in a wireless communication system environment in which high frequency band Massive MIMO beamforming is introduced, high throughput can be expected while securing coverage. However, in order to continuously maintain a high throughput, it is necessary to continue selecting an appropriate beam having a high received power from a large number of beams while following the movement of the user. PATENT LITERATURE 1 discloses a mobile communication system which can make a beam efficiently follow a user's movement. The base station apparatus of the PATENT LITERATURE 1 transmits to the user apparatus a beam stream including a plurality of beams corresponding to a plurality of channel measurement reference signals precoded to the user apparatus. On the other hand, the user apparatus receives said plurality of beams, selects a beam having the highest received power from among the plurality of beams, and notifies the base station apparatus. It is said that, at that time, the user apparatus can efficiently perform beam-following by receiving not only the currently used beam but also a beam candidate that may be used after moving in advance.

The high frequency band has a feature that radio waves are less likely to be diffracted compared with the low frequency band. For this reason, various researches have been made while referring to an environment where radio waves directly reach as an LOS (Line Of Sight; line of sight) environment, and an environment where radio waves do not reach as an NLOS (Non Line Of Sight; outside of line of sight) environment. Generally, it is said that in the NLOS environment, radio waves are hard to reach, and it is difficult to secure an independent transmission path (stream).

It can be estimated whether it is the LOS environment or the NLOS environment by the reception SNR reported from a wireless terminal (hereinafter simply referred to as "S/N" or "SN ratio") or received SINR (Signal to Interference plus Noise Ratio), and so on. Therefore, as the reception condition becomes worse, rank adaptation for reducing the number of streams is applied, and in short, a method of selecting MIMO as a transmission scheme in the LOS environment and selecting SISO (Single Input Single Output) in the NLOS environment is adopted.

PATENT LITERATURE 2 discloses a wireless communication method which enables to minimize interference between adjacent channels and to communicate with good characteristics even if a plurality of base stations and terminal stations are simultaneously operated on a plurality of channels. In particular, paragraphs 0055-0057 of PATENT LITERATURE 2 describe that the throughput at the time of communication can be estimated from the SNR, and further describes to select a beam with which the best overall performance of the base stations 10-1 to 10-4 is achieved by using this throughput.

PATENT LITERATURE 3 discloses a base station controller which enlarges an area where base station-cooperative communication is available in which a plurality of base stations cooperatively communicate with a mobile station and perform the base station cooperative communication in accordance with the wireless communication condition. Specifically, it is said that upon receiving an cooperative communication request from a base station controller of another base station, the base station cooperative part 10 provided per base station 1 determines whether or not base station cooperative communication should be performed on the basis of an evaluation value of a single site connection capacity and an evaluation value of a multi-site connection capacity.

PATENT LITERATURE 4 discloses a terminal including a communication mode determination part which determines to communicate at least one of the access point and the base station based on the radio system risk information which indicates the risk of lowering the throughput of the wireless system that was evaluated by the parent system.

PATENT LITERATURE 1: Japanese Patent No. 6121931B
PATENT LITERATURE 2: Japanese Patent Kokai Publication No. JP-P2015-164271A
PATENT LITERATURE 3: Japanese Patent Kokai Publication No. JP-P2010-239303
PATENT LITERATURE 4: Japanese Patent Kokai Publication No. JP-P2015-115667

SUMMARY

The following analysis has been made from the viewpoint of the present invention. The base station using the high frequency band as described above is also expected to be installed and operated in an urban area where many wireless terminals in an LOS environment can exist. For example, it is considered that service can be provided to many users in the LOS environment by installing the base station on a rooftop of a building and so on overlooking a street in an urban area called a street canyon.

However, there is a problem in that the traffic of vehicles is often large on the streets of the city area, and the NLOS environment occurs for the users who are riding in the vehicles. As shown in FIG. 18, radio waves in a high frequency band can pass through a windshield of a vehicle, and thus can be regarded as the LOS environment when there is no shielding object between a wireless terminal in the vehicle and a base station. On the other hand, if a user's body, a seat back, or the like is present between the wireless terminal in the vehicle and the base station, an NLOS environment occurs, and there is a problem in that the throughput is reduced.

As one countermeasure against the above, it is conceivable to detect that the wireless terminal has fallen into an NLOS environment using an index such as the SN ratio of the channel measurement reference signal and switch to SISO (Single Input Single Output) transmission. However, even with this method, there is a case where the required throughput may not be secured.

Hereinafter, a problem in a case where a transmission scheme and a transmission/reception point (Transmission/Reception Point; hereinafter, referred to as "TRP") are switched over using the reception strength of the channel measurement reference signal will be described. As shown in FIG. 19, it is assumed that, along a road, a transmitting/receiving point TRP #1 transmitting beams #1 to #9 and a TRP #2 transmitting beams #21 to #29 are arranged at 500 m intervals. An example will be described in which the vehicle travels on this road from a position P1 on the TRP #1 side toward a position P5 on the TRP #2 side. As shown in FIG. 19, the region of beams #7 to #9 of the TRP #1 and the region of beams #21 to #23 of the TRP #2 overlap each other.

As shown in FIG. 20, a section from the position P1 to the position P2 has the LOS environment because there is no shielding object between the wireless terminal MT in the vehicle and the TRP #1. On the other hand, a section between the position P2 to the position P3 has the NLOS environment because a shielding object such as a seat back of a vehicle exists between the wireless terminal MT and the TRP #1.

As a result of falling into the NLOS environment, the reception strength of the channel measurement reference signal at the wireless terminal MT decreases. Therefore, the base station and the wireless terminal MT switch over the transmission scheme to SISO as shown in FIG. 21.

Thereafter, when the vehicle reaches a position P3, the reception intensity of the channel measurement reference signal of the TRP #2 becomes stronger than the reception intensity of the channel measurement reference signal from the TRP #1. Therefore, the base station and the wireless terminal MT execute a switching process to the TRP #2 as shown in FIG. 22. As a result, there is no shielding object between the wireless terminal MT and the TRP #2, and the LOS environment occurs. Thereafter, even at a position past the position P4, the same occurrence as that for the position P2 can occur. For this reason, a user riding in the vehicle will experience a periodic degradation in service quality.

FIG. 23 shows the distance of the wireless terminal from the position P1, and the changes in the SN ratios of the channel measurement reference signals of the TRP #1 and the TRP #2 at each point. As shown in FIG. 23, since the section from the position P1 to the position P2 is in the LOS environment, the SN ratio of the channel measurement reference signal of the TRP #1 increases as the vehicle approaches the TRP #1. When it passes over the position P2, an NLOS environment occurs. Thereafter, as it moves away from the TRP #1, the SN ratio of the channel measurement reference signal of the TRP #1 decreases. In the example of FIG. 23, at a position away by 310 m from the position P1 (origin), the switching process to the TRP #2 is performed because the SN ratio of the channel measurement reference signal of the TRP #2 exceeds the SN ratio of the channel measurement reference signal of the TRP #1. From this time, the SN ratio of the channel measurement reference signal of the TRP #2 increases as the vehicle approaches the TRP #2.

FIG. 24 is a diagram illustrating a distance of the wireless terminal from the position P1, a transmission scheme that can be selected at each point, and a change in throughput thereof. According to FIG. 24, at the point away by 290 m from the position P1, the MIMO transmission of the TRP #2 has a higher throughput. This is because the throughput is increased by a multiplex transmission using a plurality of streams in MIMO, while a single stream is used for a transmission in SISO. However, as described with reference to FIG. 23, when the TRP is switched over based on the SN ratio, the throughput is reduced in a section of about 20 m from 290 m to 310 m (4% of the distance between TRPs (500 m)). In the example of FIG. 24, the throughput falls below 0.6 Gbps at the distance of around 310 m. The numerical value of 0.6 Gbps is an averagely required throughput in a high-quality VR/AR (Virtual Reality/Augmented Reality) service expected to be used in 5G. Therefore, in the selection of the TRP and the transmission scheme shown in FIGS. 19 to 22, it is foreseen that the required throughput cannot be obtained in the section of 290 m to 310 m and the user service will be affected.

It is an object of the present invention to provide a base station apparatus, a service provision method, and a program that can contribute to optimization of switching of TRP(s) at a base station using the high frequency band.

According to a first aspect, a base station apparatus connected to a plurality of transmission/reception points any one of which switches a transmission scheme according to a reception environment of a wireless terminal and provides a service to the wireless terminal is provided. The base station apparatus includes a history recording part that records a measured throughput by a combination of a beam and a transmission scheme selected by said wireless terminal with respect to each of a plurality of said transmission/reception points. The base station apparatus further includes a calculation part that calculates a predicted throughput when a service by a combination of a predetermined beam and a transmission scheme is received from a second transmission/reception point which is different from a first transmission/reception point to which said wireless terminal is being connected. The base station apparatus further includes a transmission/reception point selection part that provides the service from the second transmission/reception point to said wireless terminal by the beam and the transmission scheme that correspond to the predicted throughput when a relationship between the measured throughput and the predicted throughput satisfies a predetermined switching condition.

According to a second aspect, there is provided a service provision method that includes: calculating a predicted throughput when a service by a combination of a predetermined beam and a transmission scheme is received from a second transmission/reception point that is different from a first transmission/reception point to which said wireless terminal is being connected with reference to a history recording part which records a measured throughput by a combination of a beam and a transmission scheme selected by said wireless terminal with respect to each of a plurality of transmission/reception points which switches a transmission scheme according to a reception environment of a wireless terminal and provides a service to the wireless terminal; and providing the service from said second transmission/reception point to said wireless terminal by the beam and the transmission scheme that correspond to said predicted throughput when a relationship between the measured throughput and the predicted throughput satisfies a predetermined switching condition. The present method is tied to a particular machine, namely, a base station apparatus that switches a plurality of transmission/reception points and provides a service to a user.

According to a third aspect, there is provided a program, causing a computer mounted on a base station apparatus to perform processes of: calculating a predicted throughput when a service by a combination of a predetermined beam and a transmission scheme is received from a second transmission/reception point that is different from a first transmission/reception point to which said wireless terminal is being connected with reference to a history recording part which records a measured throughput by a combination of a beam and a transmission scheme selected by said wireless terminal with respect to each of a plurality of transmission/reception points which switches a transmission scheme according to a reception environment of a wireless terminal and provides a service to the wireless terminal; and providing the service from said second transmission/reception point to said wireless terminal by the beam and the transmission scheme that correspond to said predicted throughput when a relationship between the measured throughput and the predicted throughput satisfies a predetermined switching condition. Further, this program may be stored in a computer-readable (non-transitory) storage medium. In other words, the present invention can be realized as a computer program product. The program is input to the computer apparatus via an input device or an external device via a communication interface, stored in the storage device, drives the processor according to predetermined steps or processing, and causes the processor to display step by step the processing result including the intermediate state via a display apparatus as necessary or can cause the processor communicate externally via a communication interface. The computer apparatus for that purpose has, as an example, a processor, a storage device, an input device, a communication interface, and a display device as needed, which are typically connectable to each other by a bus.

According to the present invention, it is possible to optimize switching of TRP in a base station using the high frequency band. That is, the present invention is one which converts the base station apparatus described in the background into one having an optimized function of switching of a TRP.

BRIEF DESCRIPTION OF DRAWINGS

FIG. 4 illustrates an example of a first table held in the base station apparatus according to the first exemplary embodiment of the present invention.

FIG. 5 illustrates an example of a second table held in the base station apparatus according to the first exemplary embodiment of the present invention.

FIG. 6 illustrates another example of the second table held in the base station apparatus according to the first exemplary embodiment of the present invention.

FIG. 11 illustrates an example of information held in a base station apparatus according to a second exemplary embodiment of the present invention.

FIG. 14 illustrates an example of a first table held in base station apparatuses according to a fourth exemplary embodiment of the present invention.

FIG. 15 illustrates an example of a second table held in the base station apparatus according to the fourth exemplary embodiment of the present invention.

PREFERRED EMBODIMENTS

Figure 1:
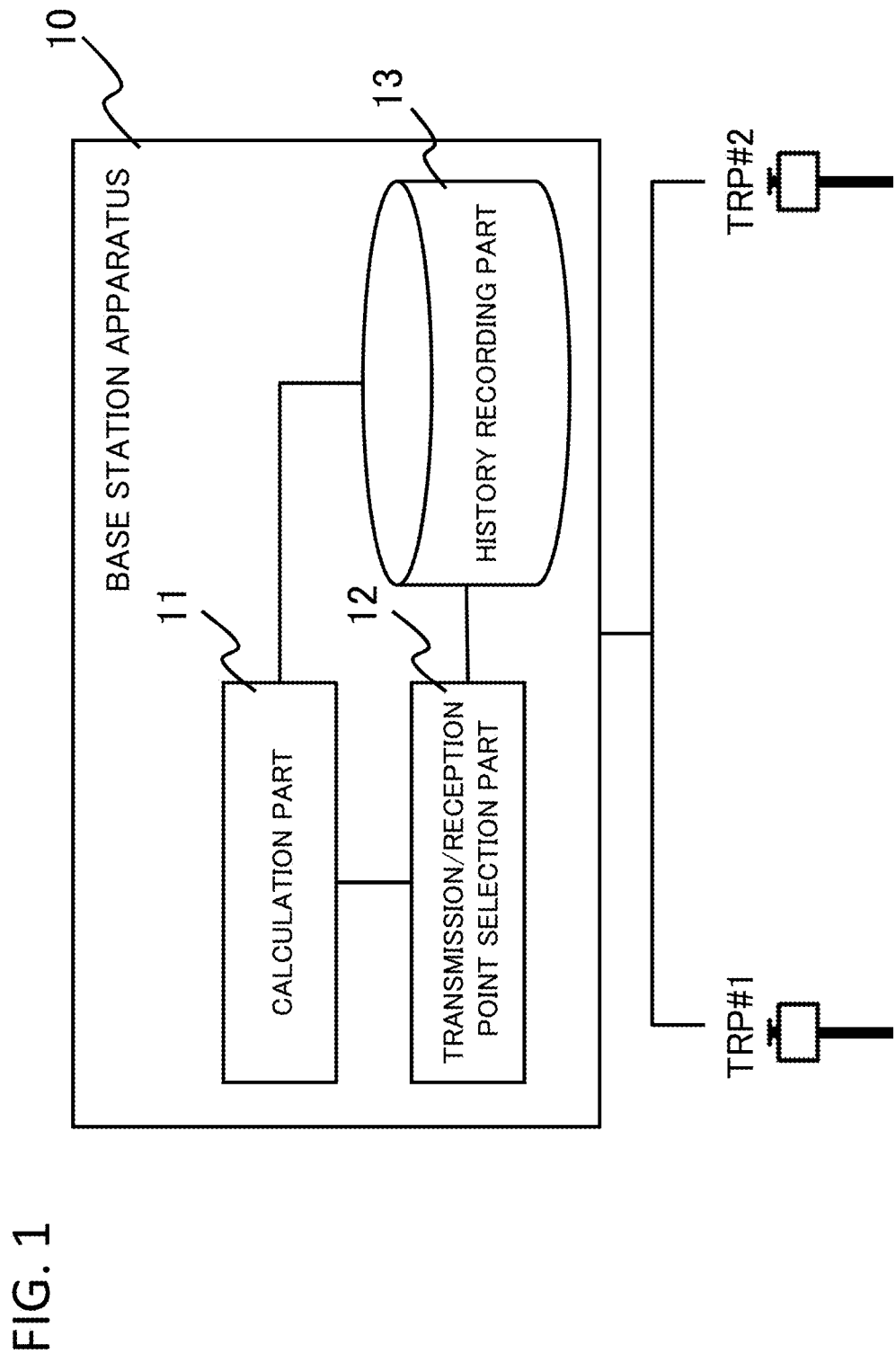
FIG. 1 illustrates a configuration of an exemplary embodiment of the present invention.

First, an outline of an exemplary embodiment according to the present invention will be described with reference to the drawings. In the following outline, reference characters of the drawings are denoted to various elements for the sake of convenience to facilitate understanding of the present invention and they are not intended to limit the present invention to the exemplary embodiment as shown in the drawings. Further, connection lines between blocks in the drawings and the like referred to in the following description include both bidirectional and unidirectional. The one-way arrow schematically shows the flow of a main signal (data), and it does not exclude bidirectionality. Ports and interfaces are provided at input/output connection points of each block in the drawings, but they are not shown. The program is executed via a computer apparatus, and the computer apparatus includes, for example, a processor, a storage device, an input device, a communication interface, and a display device as necessary. In addition, the computer apparatus is configured to be able to communicate by wire or wirelessly with an apparatus (including a computer) inside or outside the apparatus via a communication interface.

According to an exemplary embodiment of the present invention, as shown in FIG. 1, the present invention is realized by a base station apparatus 10 connected to a plurality of transmission/reception points (TRPs) any one of which switches over (may be referred to as—switches—hereinafter) a transmission scheme according to a reception environment of a wireless terminal and provides a service to a wireless terminal.

More specifically, the base station apparatus 10 includes a history recording part 13, a calculation part 11, and a transmission/reception point selection part 12. The history recording part 13 records, for each of the plurality of TRPs, a measured throughput by a combination of a beam and a transmission scheme selected by the wireless terminal. The storage of the data in the history recording part 13 may be performed by the base station apparatus 10, or that may be performed by the transmission/reception point or by a higher-level apparatus. Here, as the measured throughput, a throughput measured between the wireless terminal connected to a TRP and the TRP can be used. The entity that performs the measurement may be the TRP, or a throughput obtained from a throughput measurement apparatus can be used.

The calculation part 11 calculates a predicted throughput when a service by a combination of a predetermined beam and a transmission scheme is received from a second transmission/reception point which is different from a first transmission/reception point to which said wireless terminal is being connected.

The transmission/reception point selection part 12 provides the service from the second transmission/reception point to the wireless terminal by the beam and the transmission scheme that correspond to the predicted throughput when a relationship between the measured throughput and the predicted throughput satisfies a predetermined switching condition.

Figure 2:
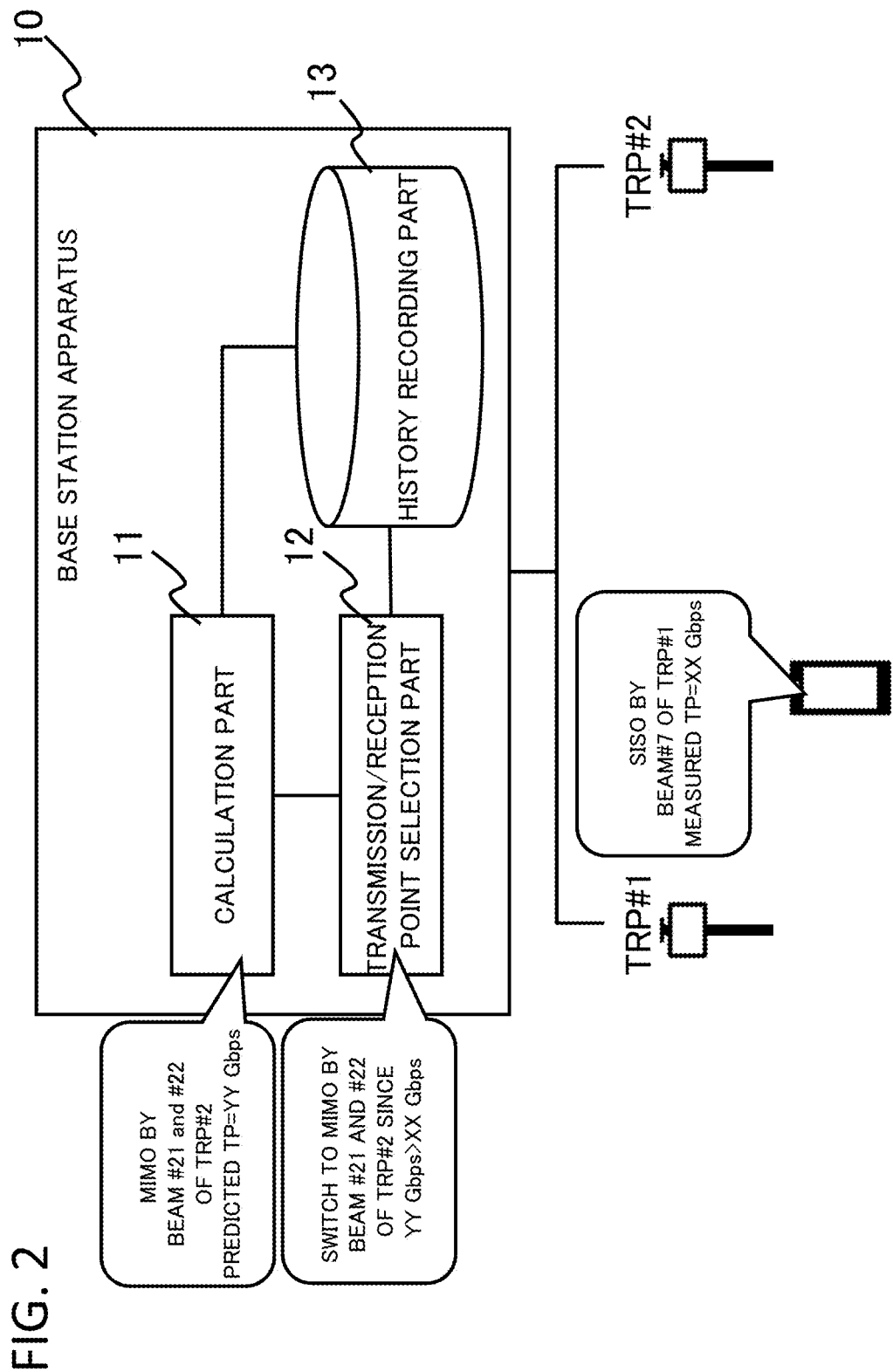
FIG. 2 illustrates an operation of an exemplary embodiment of the present invention.
Figure 19:
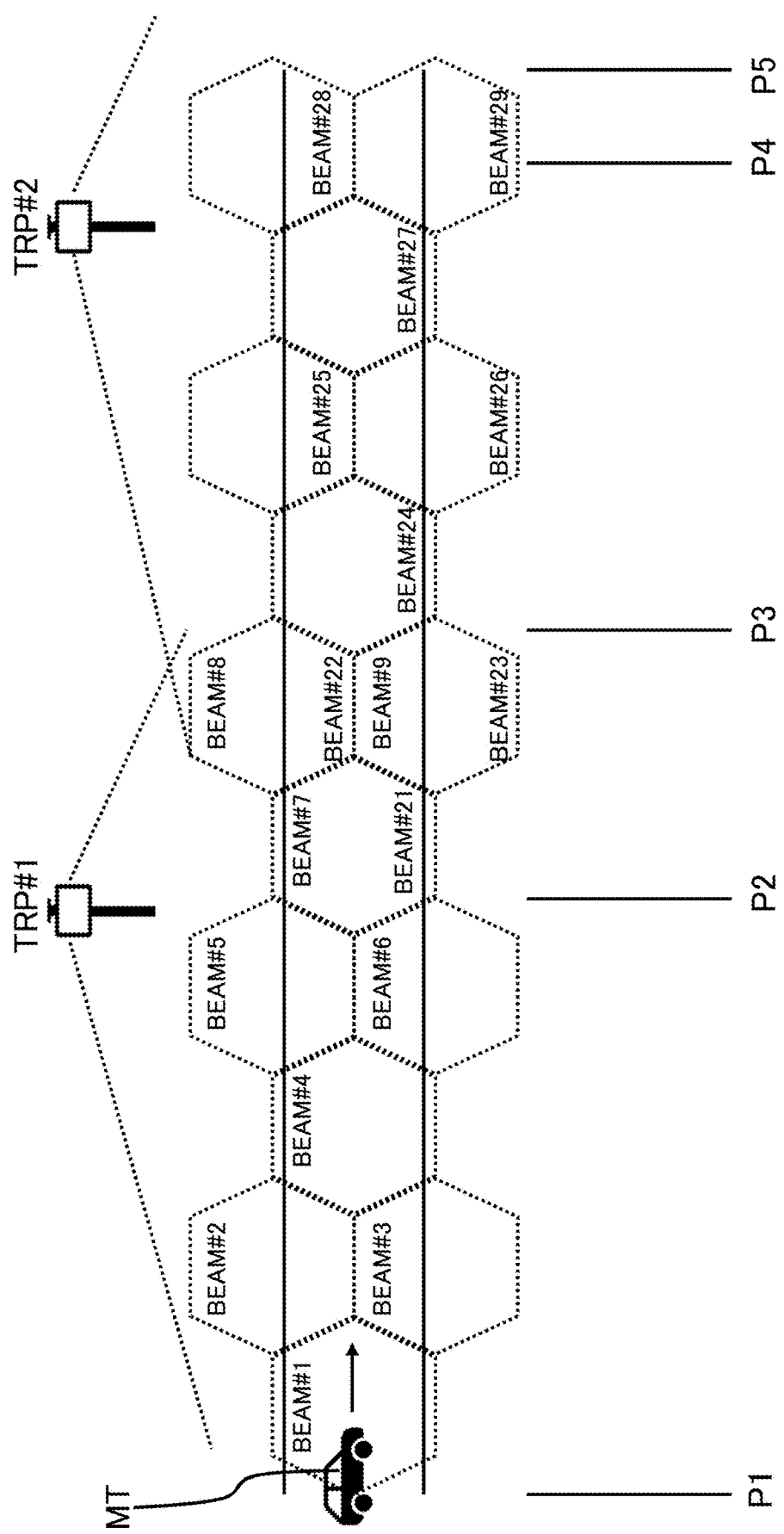
FIG. 19 illustrates a switching process of a transmission scheme and a transmission/reception point according to a relative positional relationship between the transmission/reception point and a terminal.
Figure 20:
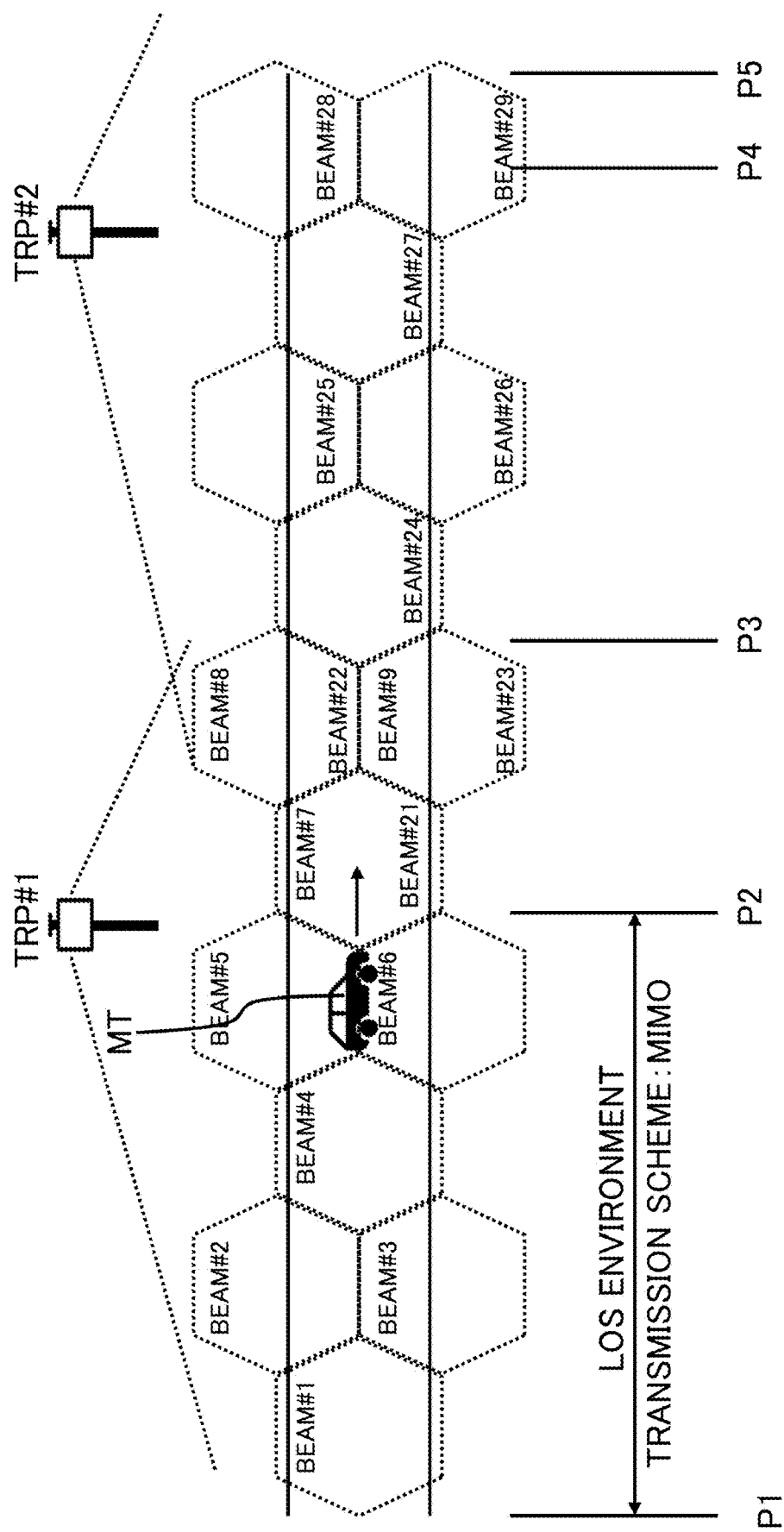
FIG. 20 illustrates a switching process of a transmission scheme and a transmission/reception point according to a relative positional relationship between the transmission/reception point and a terminal.
Figure 21:
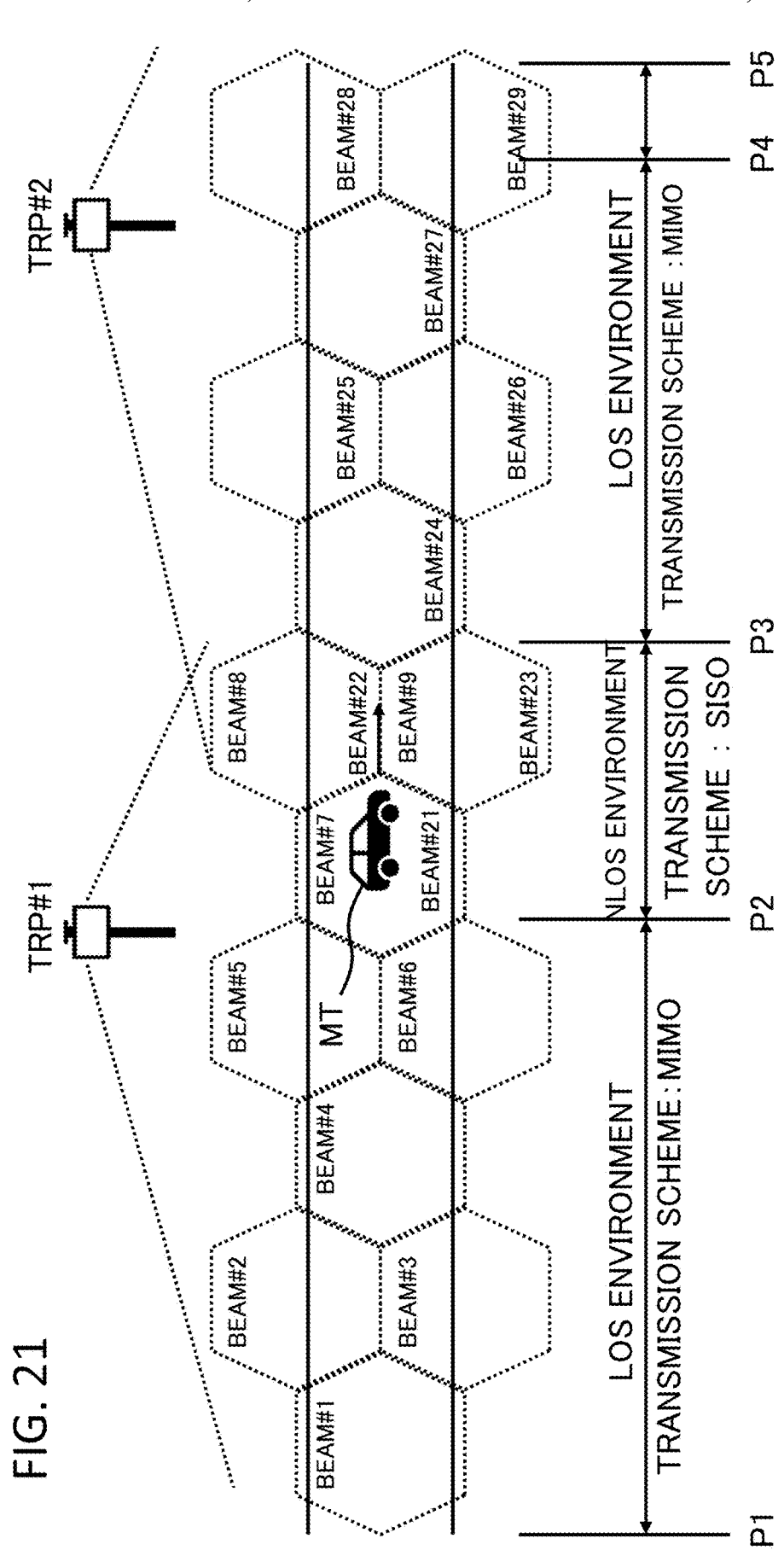
FIG. 21 illustrates a switching process of a transmission scheme and a transmission/reception point according to a relative positional relationship between the transmission/reception point and a terminal.
Figure 22:
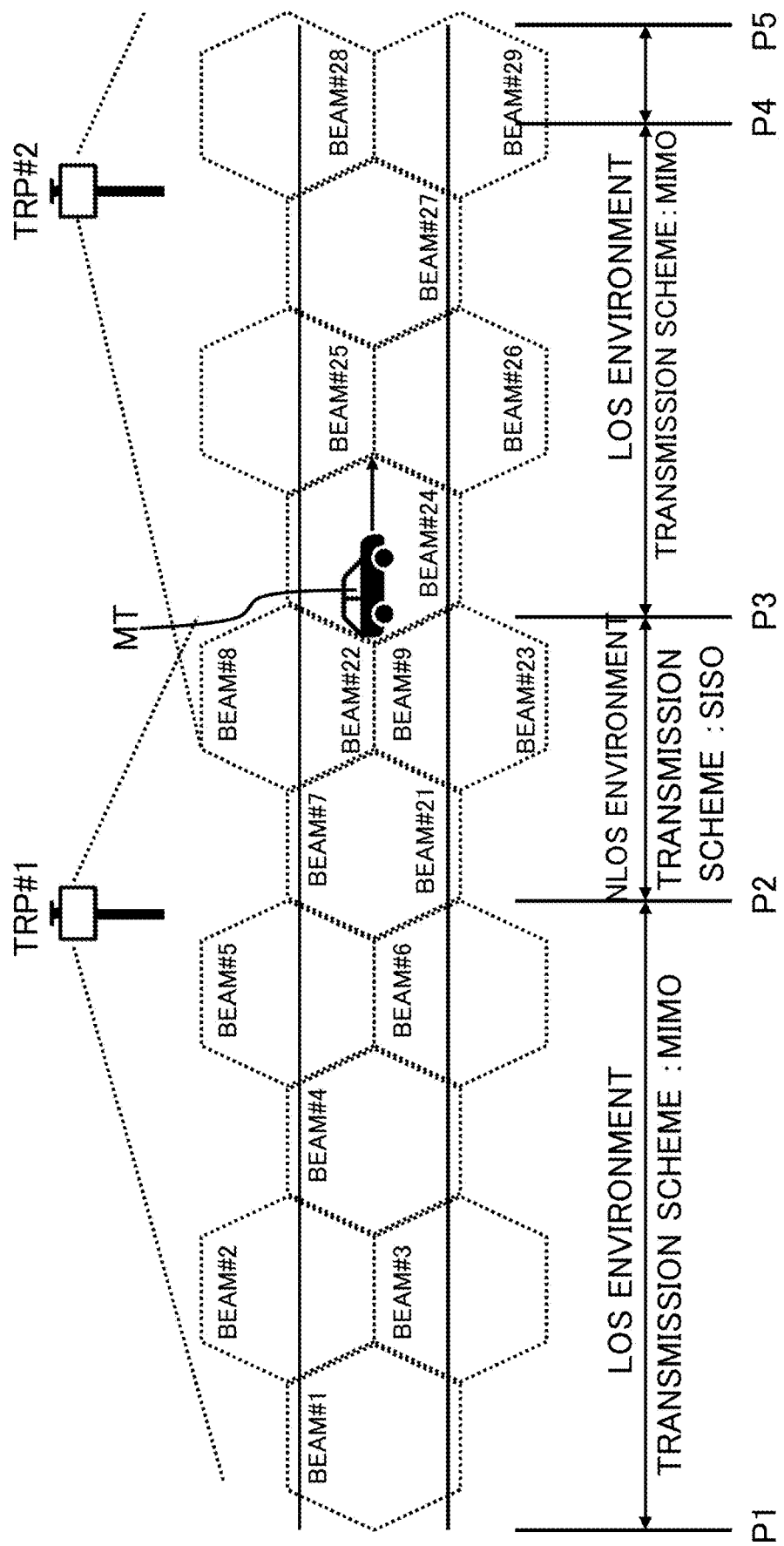
FIG. 22 illustrates a switching process of a transmission scheme and a transmission/reception point according to a relative positional relationship between the transmission/reception point and a terminal.

For example, as shown in FIG. 2, the calculation part 11 calculates a predicted throughput in a case where a service by a combination of a predetermined beam and a transmission scheme is received from a TRP #2 which is different from the TRP #1 to which said wireless terminal is being connected. For example, in the example of FIG. 2, the predicted throughput (predicted TP) in the case where a service is received by the MIMO transmission using a beam #21 and a beam #22 of the TRP #2 (for example, see BEAM #21 and #22 in FIG. 19) is calculated as YY Gbps.

On the other hand, when the measured throughput (measured TP) between the wireless terminal and its connected TRP #1 is XX Gbps, the transmission/reception point selection part 12 compares these two throughputs, and determines whether or not to provide the service to the wireless terminal by MIMO transmission using the beam #21 and beam #22 of the TRP #2. The switching condition may be, for example, that the measured throughput of the TRP #1 and the predicted throughput of the TRP #2 are simply compared, and a combination of a TRP and a transmission scheme that provides a higher throughput can be selected. Instead of simply comparing the two throughputs, a correction value may be added to one of the throughputs or a correction coefficient may be multiplied. For example, the combination of the beam and the transmission scheme of the TRP corresponding to the predicted throughput may be selected when the measured throughput<the predicted throughput+$\alpha$ is satisfied (where $\alpha$ is an offset value for determination that may be a negative value). In this manner, the switching timing can be adjusted to an early or later timing.

Further, in the above example, switching of the TRP in a single base station has been described as an example, but switching to an adjacent TRP may be performed in cooperation between base stations. This may be achieved by providing a mechanism for sharing information of the history recording part 13 between the base stations.

First Exemplary Embodiment

Next, a first exemplary embodiment of the present invention will be described in detail with reference to the drawings. In the following description, in each of the drawings, the same elements are denoted by the same reference numerals, and redundant description will be omitted unless necessary for clarification of the description. In the following description, "A and/or B" is used to mean at least one of A or B.

Figure 3:
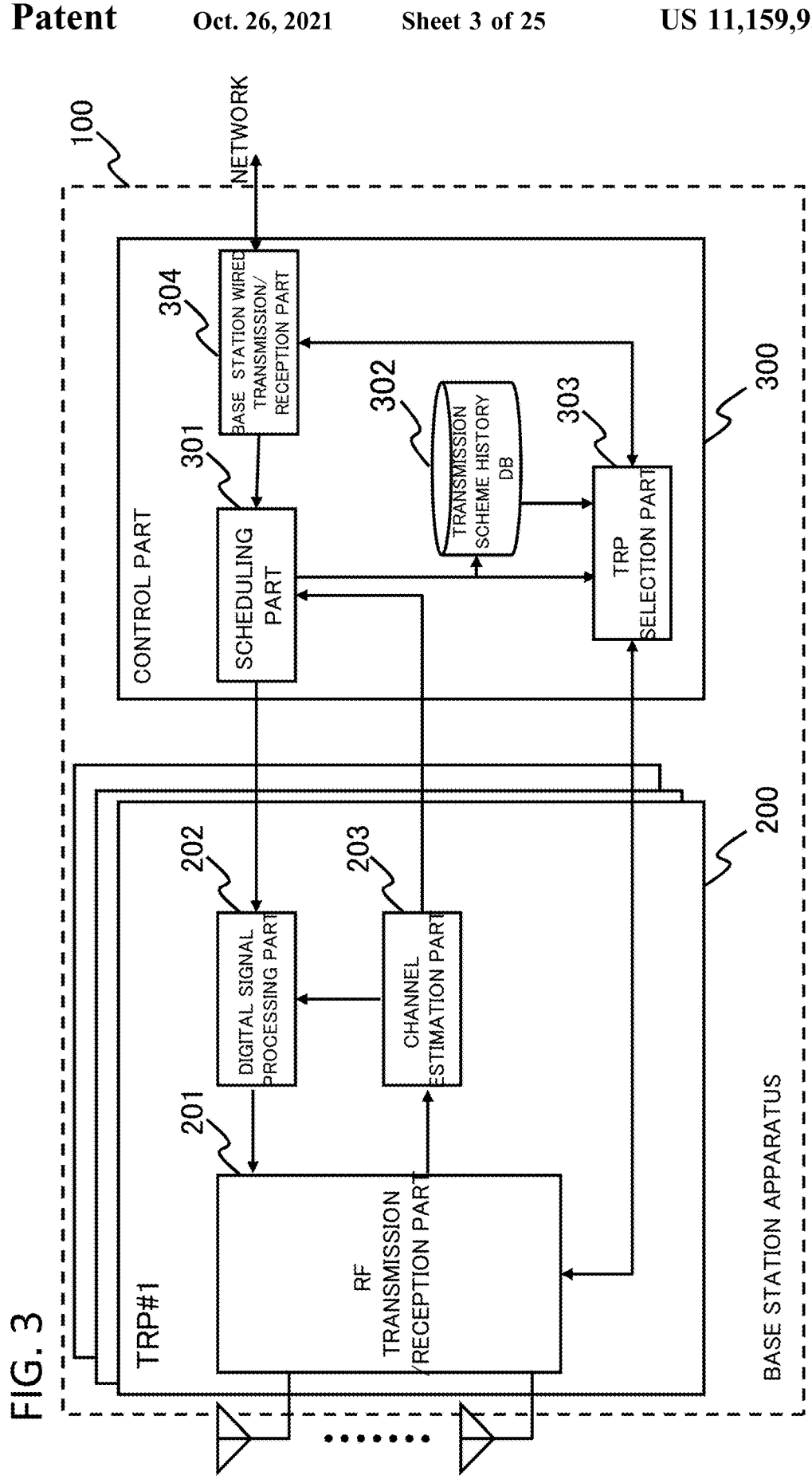
FIG. 3 illustrates a configuration of a base station apparatus according to a first exemplary embodiment of the present invention.

FIG. 3 illustrates a configuration of a base station apparatus according to a first exemplary embodiment of the present invention. Referring to FIG. 3, a configuration of a base station apparatus 100 including a plurality of TRPs 200 and a control part 300 is shown. The plurality of TRPs 200 are respectively arranged at predetermined positions so as to cover a coverage area of the base station. Each TRP 200 performs beamforming toward its own covering area by performing predetermined precoding on a beam reference signal.

The TRP 200 includes an RF transmission/reception part 201, a digital signal processing part 202, and a channel estimation part 203. Since the configurations of all TRPs 200 are the same, the description of the configurations of the other TRPs are omitted.

The RF transmission/reception part 201 is connected to $N_T$ (for example, 128) antenna elements, and has a basic function of wireless transmission and reception as a base station apparatus in a general wireless communication system for wireless communication with a wireless terminal 400. The basic functions include, for example, the following functions.

1) a transmission function of downlink reference signals (beam RS (Reference Signal), cell-specific RS, etc.), downlink control signals (PDCCH: Physical Downlink Control Channel, etc.) and downlink data signals (PDSCH: Physical Downlink Shared Chanel, etc.),
2) a reception function of uplink reference signals (SRS: Sounding Reference Signal, etc.), uplink control signal (PUCCH: Physical Uplink Control Channel) and uplink data signal (PUSCH: Physical Uplink Shared Channel),
3) an analog beam forming function for adjusting amplitudes and phases of radio waves from each antenna element and superposing each of the radio waves so that the radio waves are focused and transmitted/received in predetermined directions horizontally and vertically at a fixed interval (for example 15 degrees).

The details of each function, including the other functions of the RF transmission/reception part 201, are well-known to those skilled in the art, and thus description thereof is omitted.

The digital signal processing part 202 performs digital precoding processing on data streams spatially multiplexed with the same time and the same frequency block (called a resource block or a resource block group in LTE). As a specific technique of the digital precoding processing, any of various known techniques may be applied, and for example, block diagonalization for suppressing interference between terminal apparatuses by null formation may be applied.

The channel estimating part 203 estimates channel quality (amplitude and phase change) for a combination of each of the antenna elements for transmitting and receiving between the terminal apparatus and the base station apparatus by receiving a radio wave transmitted from each antenna element of the wireless terminal 400 with each of the antenna elements of the base station apparatus. Then, a channel matrix is formed from the obtained channel quality and is input to the digital signal processing part 202.

The control part 300 includes a scheduling part (a resource allocation part) 301, a transmission scheme history database (a transmission scheme history DB) 302, a TRP selection part 303, and a base station wired transmission/reception part 304.

The scheduling part (resource allocation part) 301 selects a TRP, a data stream and a wireless terminal as a target for spatial multiplexing, and inputs them to the digital signal processing unit 202. As a concrete method of selecting the wireless terminal, the TRP, and the data stream, any of various known techniques may be applied. Among them, the selection of the TRP will be described later in detail.

The transmission scheme history DB 302 holds, for each TRP, a first table group that records the transmission scheme (including the selected beam) used for a communication with the wireless terminal and a measured throughput thereof, and a second table group for managing a predicted throughput calculated from the measured throughput. In the present exemplary embodiment, the transmission scheme history DB 302 corresponds to the history recording part 13 described above.

FIG. 4 is a diagram illustrating an example of a first table that records, for each TRP, a transmission scheme used for communication with a wireless terminal and a measured throughput thereupon. Referring to FIG. 4, in N TRPs 200 from a TRP #1 to a TRP #N, a measured throughput is recorded for each transmission scheme used for communication with an arbitrary wireless terminal 400. In the following description, a measured throughput by SISO of a beam X is referred to as a measured throughput $C_X$. Also, a measured throughput by MIMO using m beams from X1 to Xm is denoted as $C_{X1, \ldots, Xm}$. The period during which the measured throughput is recorded may be a fixed period in the past. Further, it is not necessary to perform recording on all beams. For example, only beam(s) adjacent to other TRP beam(s) may be recorded.

FIG. 5 is a diagram illustrating an example of a second table for managing a transmission scheme used for communication with a wireless terminal and a predicted throughput thereof for each TRP. In the example of FIG. 5, a predicted throughput created from the first table of TRP #2 among the first tables is managed. The predicted throughput is calculated using statistics such as an average, a mode, and a median of values of the measured throughput field in the first table.

For example, in the example of FIG. 5, the throughput when MIMO transmission is performed by selecting the beam 22 and the beam 23 of TRP #2 is described as $C'_{22,23}$. Similarly, the throughput when the beam 22 of the TRP #2 is selected and SISO transmission is performed is described as $C'_{22}$. Here, $C'_X$ is a predicted value obtained from the measured throughput $C_X$ of the SISO transmission of the beam X, and $C'_{X,Y}$ is a predicted value obtained from the measured throughput $C_{X,Y}$ of the MIMO transmission by the beam X and the beam Y. As described above, the predicted throughput being obtained in a case where the specific beam and the specific transmission scheme of the TRP as a target for switching is selected can be obtained by calculating the predicted throughput when each transmission scheme is selected and storing it to the second table for all the TRPs.

In the example of FIG. 5, only the correspondence between the transmission scheme and the predicted throughput is stored in the second table, but other information that can be used for comparing the throughput can be added. For example, as shown in FIG. 6, probability information of the beam and the transmission scheme which may be selected by the wireless terminal 400 being connected to the adjacent TRP #1 can be stored. As the probability information, a probability of a combination of a beam and a transmission scheme which was switched over from a beam of an adjacent TRP (for example, TRP #1), can be adopted. For example, the example in FIG. 6 indicates that 90% of the wireless terminals that have moved from the adjacent TRP have selected the MIMO by the beams 22 and 23, and that 10% of the wireless terminals have selected the SISO by the beam 22.

The base station wired transmission/reception part 304 has a basic function of wired transmission/reception of a base station apparatus in a general wireless communication system in wireless communication with the wireless terminal 400. The base station wired transmission/reception part 304 receives data addressed to the wireless terminal 400 from a higher-level network via a wired line, and transmits data from the wireless terminal 400 to the higher-level network via the wired line. Note that the functions of the base station wired transmission/reception part 304 are well known to those skilled in the art, and thus detailed descriptions of each function are omitted.

The TRP selection part 303 compares the measured throughput of the wireless terminal 400 being connected to a certain TRP with the predicted throughput by a beam of other TRP, determines whether or not to switch the TRP, and notifies the RF transmission/reception part 201. As the predicted throughput, a predicted throughput which is obtained when a specific transmission scheme is selected and a beam of other TRP that may be a candidate for connection of the wireless terminal 400 is selected with reference to the second tables shown in FIGS. 5 and 6, can be used. The TRP selection part 303 selects a beam to which the beam is to be switched over within the same TRP based on a determination result of the beam switching performed by the wireless terminal and notifies the RF transmission/reception part 201. In the present exemplary embodiment, the TRP selection part 303 corresponds to the calculation part 11 and the transmission/reception station selection part 12 described above.

Figure 7:
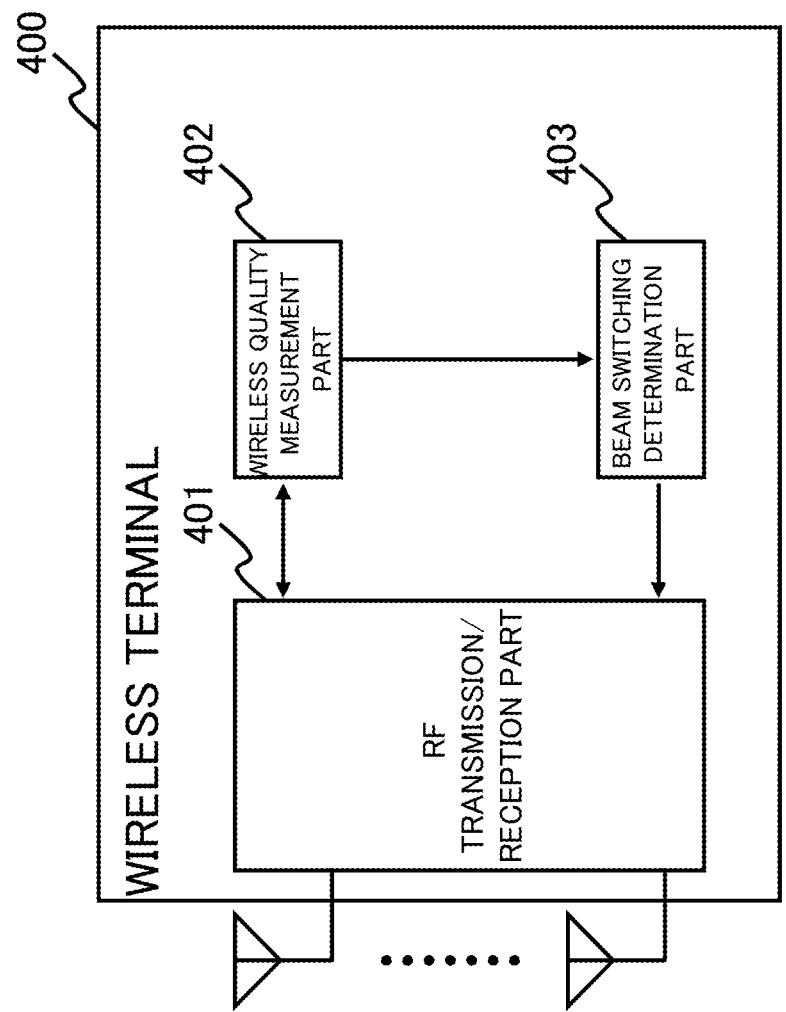
FIG. 7 illustrates a configuration of a wireless terminal according to the first exemplary embodiment of the present invention.

Next, the configuration of the wireless terminal 400 connected to the TRP will be described in detail with reference to the drawings. FIG. 7 is a block diagram illustrating a configuration of the wireless terminal 400 according to the first exemplary embodiment of the present invention. Referring to FIG. 7, a wireless terminal 400 including an RF transmission/reception part 401, a wireless quality measurement part 402, and a beam switching determination part 403.

The RF transmission/reception part 401 is connected to $N_R$ (for example, two) antenna elements and has a basic function of wireless transmission/reception for wireless communication with the base station apparatus 100. Examples of such basic functions include the following. One of them is a transmission function of an uplink reference signal (such as SRS), an uplink control signal (such as PUCCH) and an uplink data signal (such as PUSCH). There are other functions, such as a function of receiving a downlink reference signal (beam RS, CRS, etc.), a PDCCH of a downlink control signal, and a PDSCH of a downlink data signal. The RF transmission/reception part 401 may perform beamforming in downlink reception and uplink transmission using $N_R$ antenna elements. The functions which the RF transmission/reception part 401 is equipped with are well-known to those skilled in the art, and detailed descriptions of each function will be omitted.

The wireless quality measurement part 402 measures the radio signal quality used for beam switching. As the wireless signal quality, the reception power of a beam RS is measured. The beam RS to be measured includes not only a beam RS formed by the connected TRP (e.g., TRP #1) but also a beam RS formed by the adjacent TRP (e.g., TRP #2) and the adjacent base station. For these adjacent beams RS, a linking relationship between an ID for identifying the adjacent TRP or the base station and a beam ID for identifying the beam RS is known, and the beam ID of the beam RS to be measured can be specified by acquiring the ID of the adjacent TRP or the base station.

The beam switching determination part 403 determines whether or not to perform beam switching using the reception power of at least two beams RS and notifies the base station apparatus 100 of the determination result via the RF transmission/reception part 401. Base station apparatus 100 performs processing of a beam switching based on the determination result.

Figure 8:
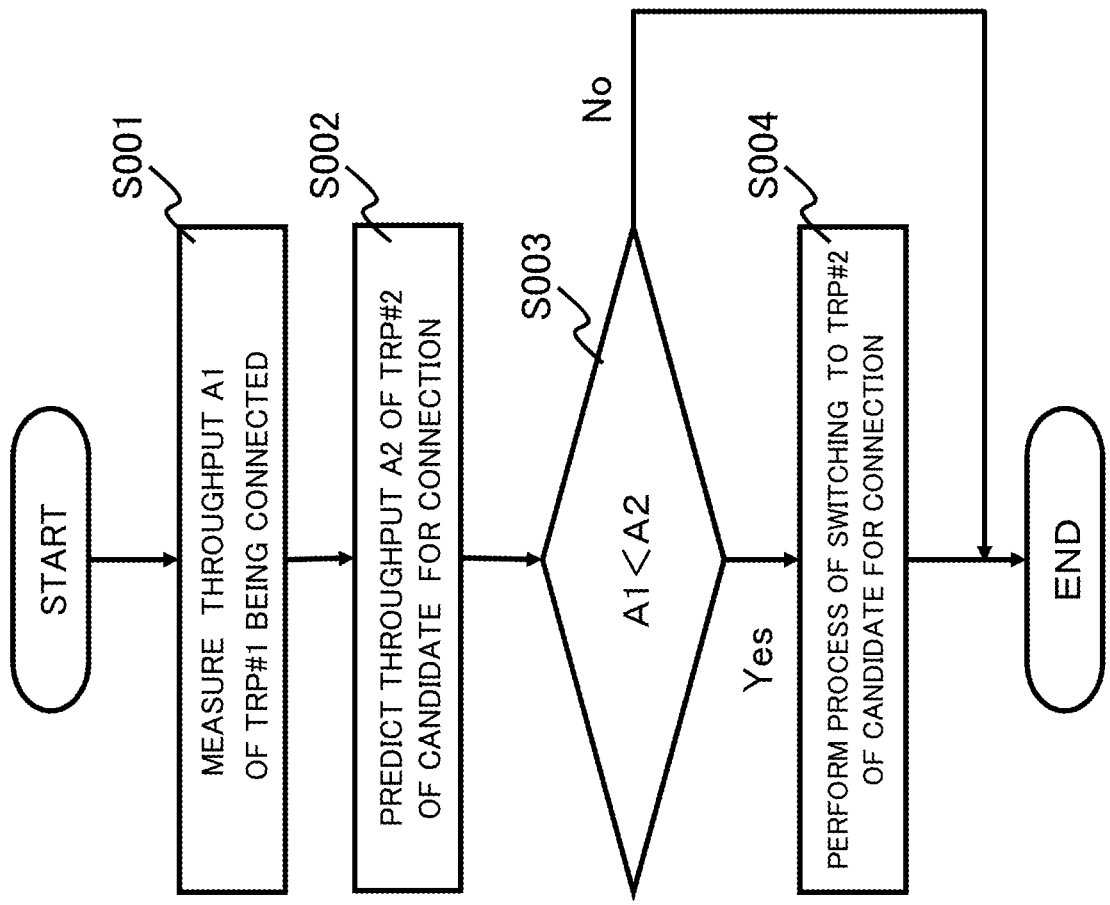
FIG. 8 illustrates a flow diagram of an operation of the base station apparatus according to the first exemplary embodiment of the present invention.

Subsequently, the operation of the present exemplary embodiment will be described in detail with reference to the drawings. FIG. 8 is a flow diagram of an operation of the base station apparatus according to a first exemplary embodiment of the present invention. First, the base station apparatus 100 measures a throughput A1 of the TRP #1 to which the wireless terminal 400 as a subject for determination of switching of the TRP is being connected (a step S001). The measured throughput A1 is stored in the first table of the transmission scheme history DB 302 as shown in FIG. 4.

Next, the base station apparatus 100 predicts a throughput A2 of the TRP #2 that can be a candidate for connection of the wireless terminal 400 (step S002). Concretely, the base station apparatus 100 updates the contents of the second table of the transmission scheme history DB 302 shown in FIG. 5 or FIG. 6 based on the contents of the latest first table and reads out the predicted throughput A2 corresponding to the beam and the transmission scheme concerned. Note that the combination of the TRP and the beam to be the candidate for connection can be identified from the beam layout information set in advance or the reception power of each beam reported from the wireless terminal 400. Here, when there are a plurality of candidates for connection, two or more predicted throughputs A2 may be read out.

Next, the base station apparatus 100 compares the throughput A1 measured in the step S001 with the predicted throughput A2 predicted in the step S002 (step S003). Here, when there are two or more predicted throughputs A2 read out in step S002, the largest one may be used. As a result of this comparison, when the predicted throughput A2 is greater than the throughput A1 (Yes in step S003), the base station apparatus 100 performs a process of switching over to the TRP #2 of the candidate for connection (step S004). Specifically, the base station apparatus 100 selects the beam and the transmission scheme for which the predicted throughput A2 has been calculated, and switches to TRP #2. On the other hand, when the predicted throughput A2 is less than or equal to the throughput A1 (No in step S003), the base station apparatus 100 halts a determination process without performing the process of switching.

Here, effects of the present invention will be described with reference to the drawings. As described above with reference to FIGS. 19 to 24, in the selection of the TRP and the transmission scheme based on the SN ratio of the reference signal for channel measurement of the TRP #1 and the TRP #2, SISO transmission of the TPP #1 is still continued in the section from 290 m to 310 m. As a result, there is a problem that the required throughput cannot be secured.

Figure 9:
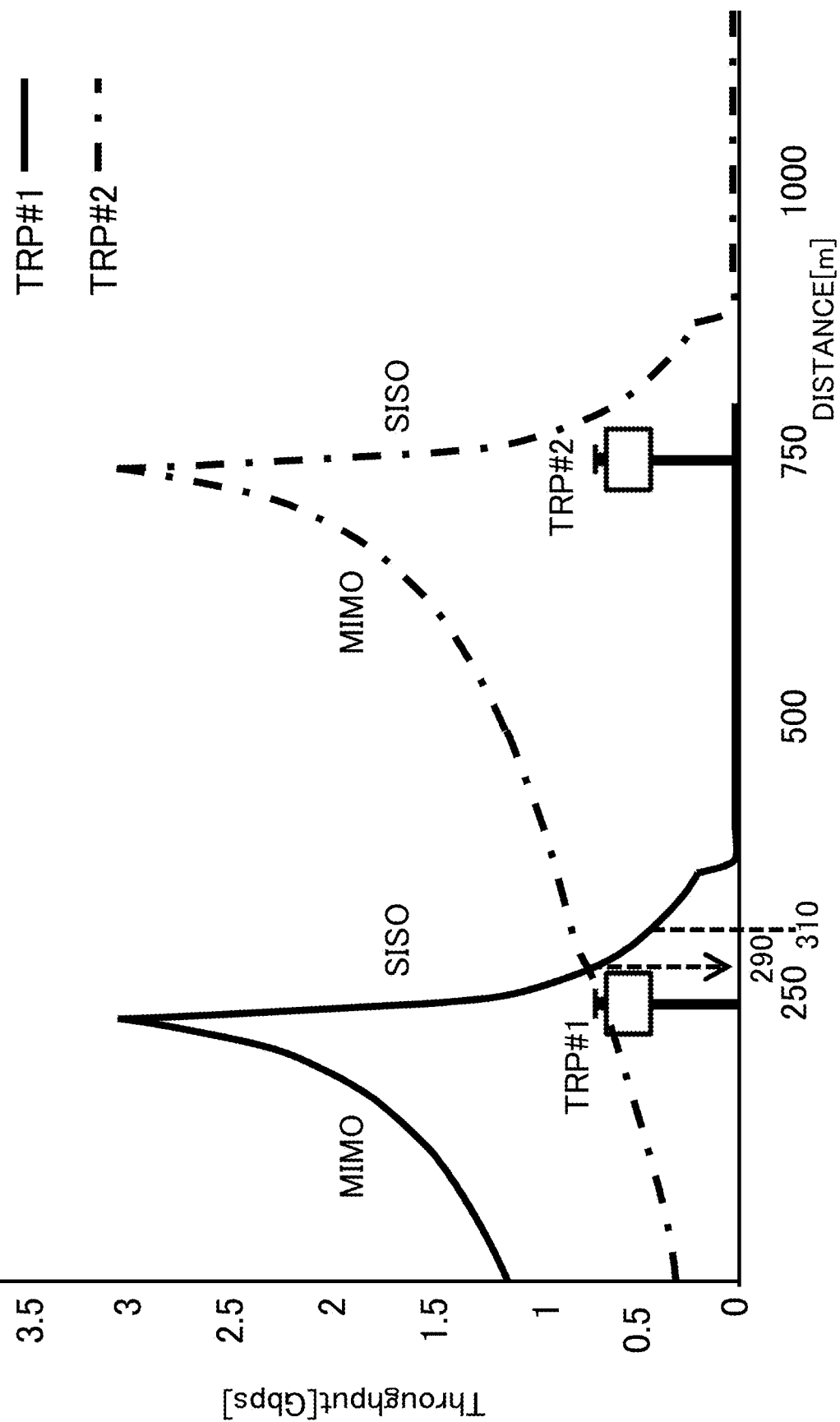
FIG. 9 illustrates a diagram explaining an effect caused by the base station apparatus according to the first exemplary embodiment of the present invention.
Figure 23:
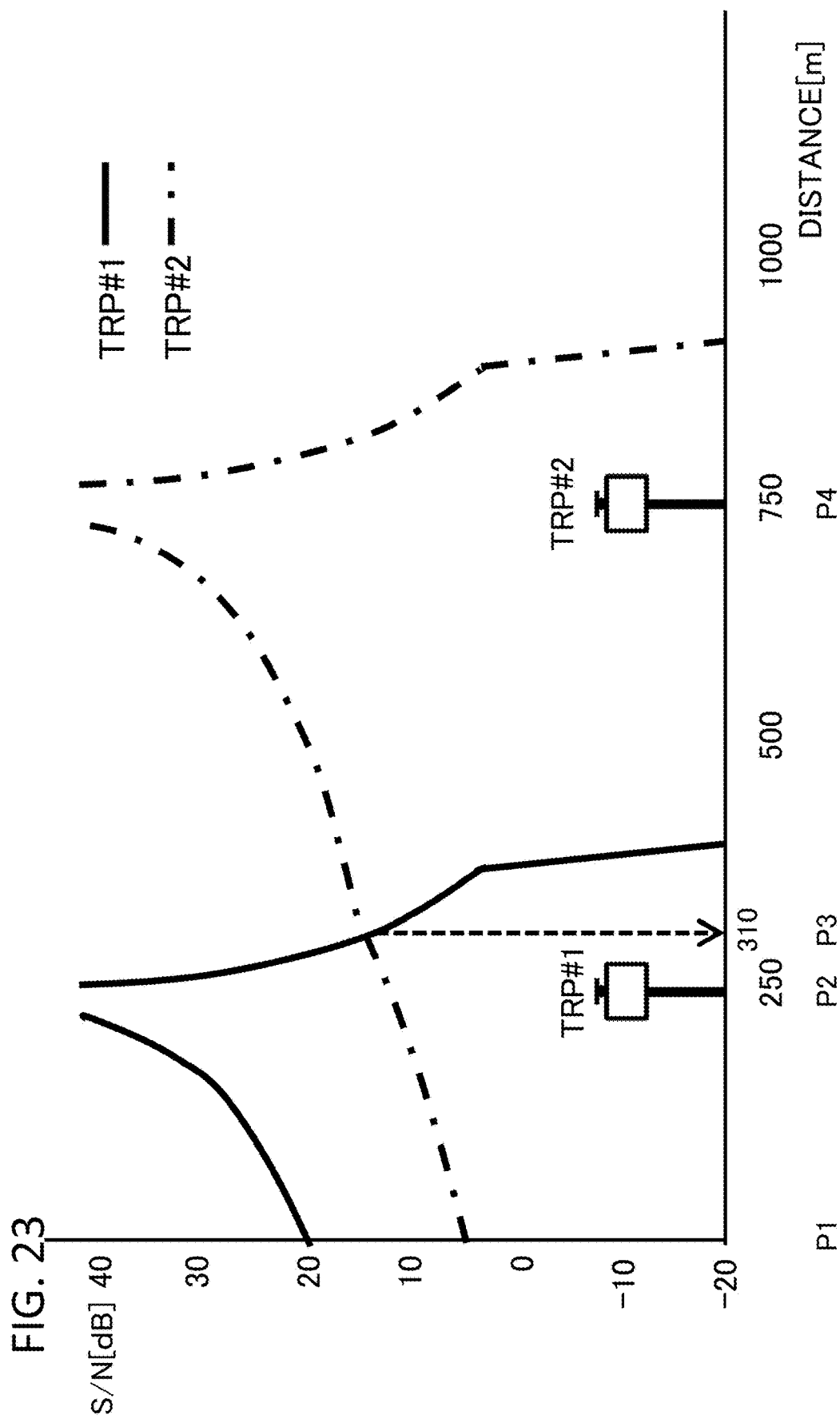
FIG. 23 illustrates a relationship between a relative positional relationship between the transmission/reception point and a terminal, and an SN ratio measured by the wireless terminal at each position.
Figure 24:
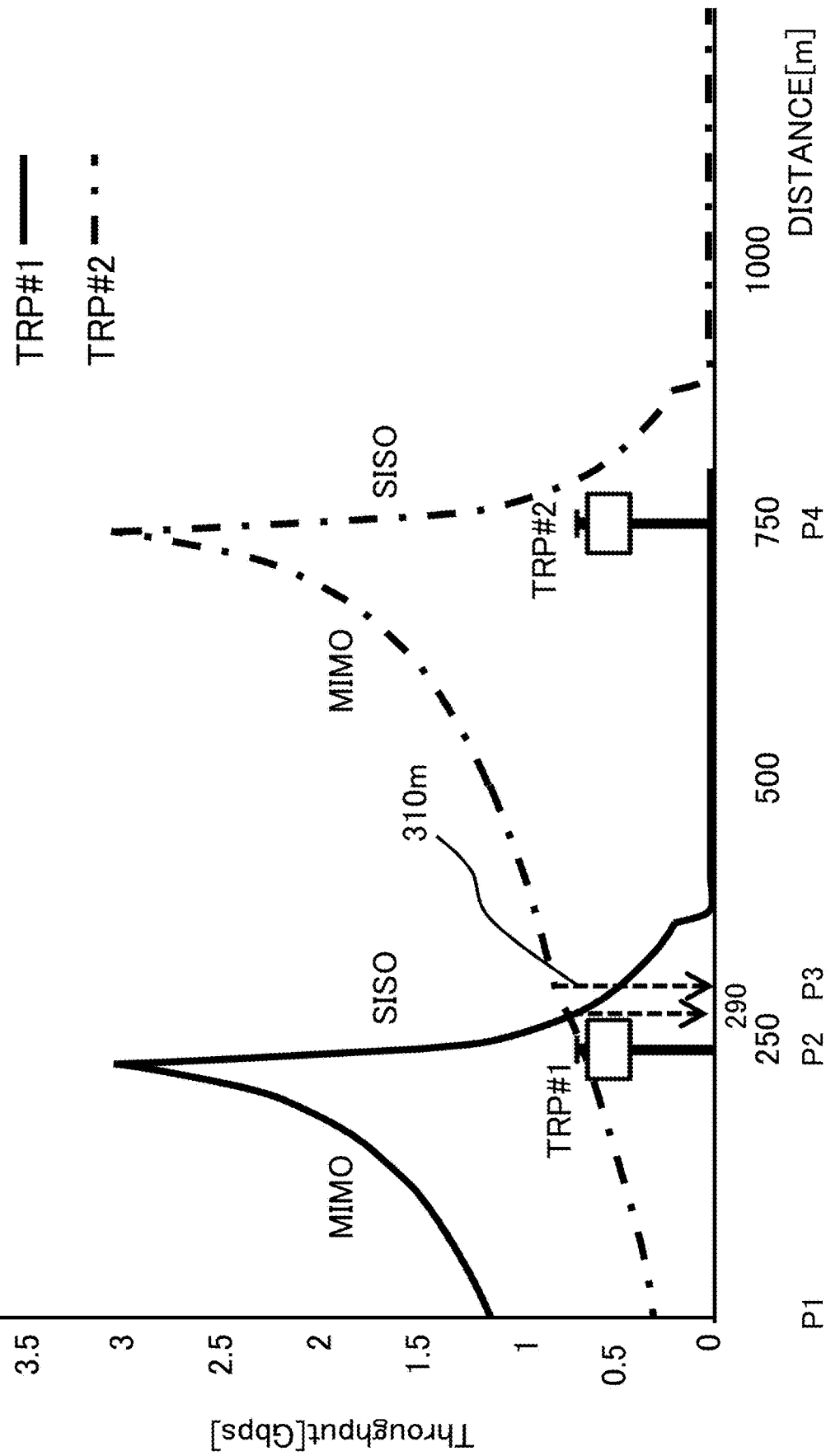
FIG. 24 illustrates a relationship among a relative positional relationship between the transmission/reception point and a terminal, a transmission scheme to be selectable and a throughput at each position.

On the other hand, in the present exemplary embodiment, as shown in FIG. 9, the predicted throughput A2 using the MIMO of the TRP #2 at the point of 290 m exceeds the throughput A1 of the TRP #1, and the switching to the TRP #2 is performed. This reversal of magnitude relation between the throughputs cannot be detected by simple comparison of the SN ratio as shown in FIG. 23.

Figure 10:
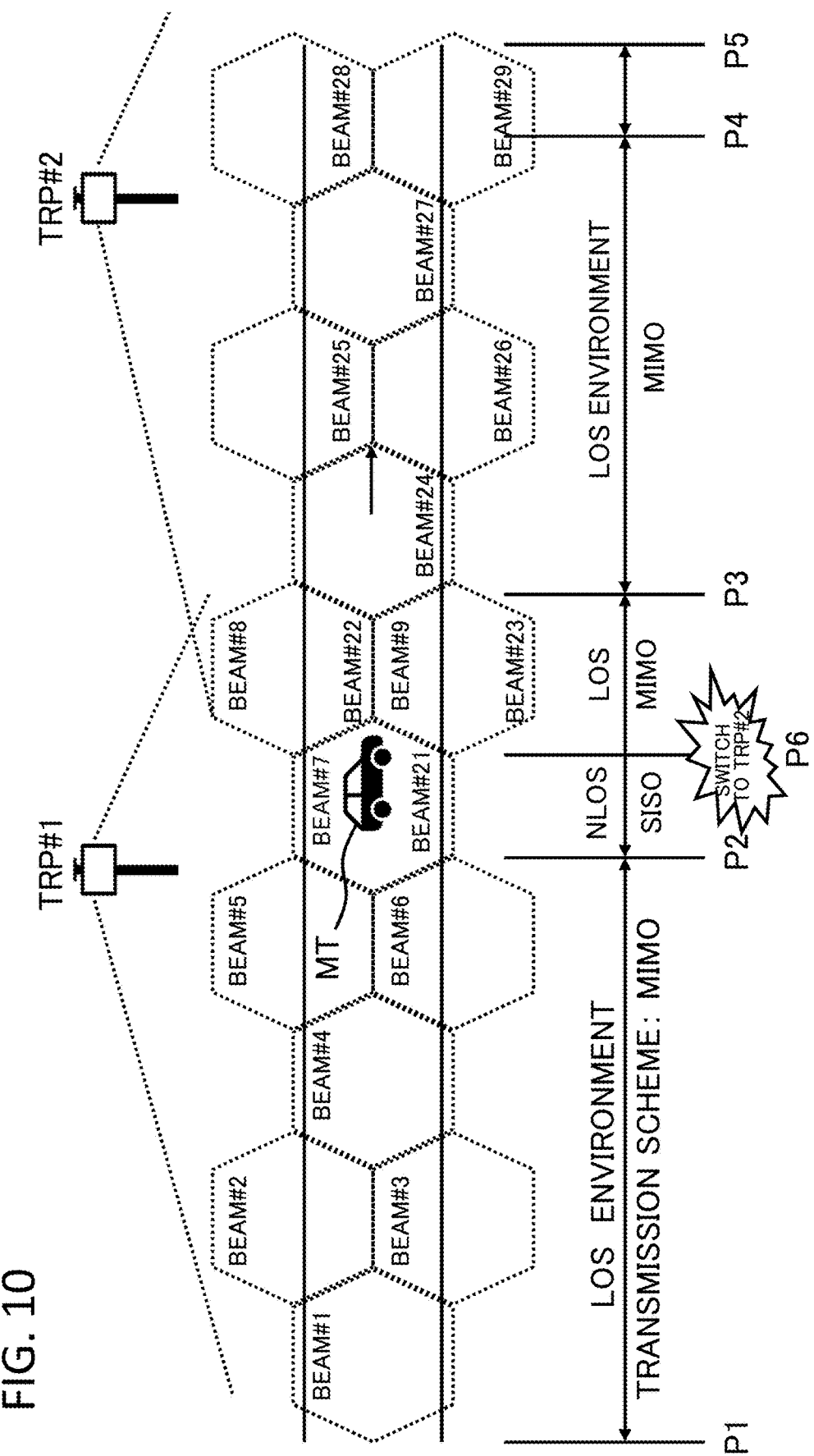
FIG. 10 illustrates another diagram explaining the effect caused by the base station apparatus according to the first exemplary embodiment of the present invention.

FIG. 10 is a diagram showing LOS/NLOS environment intervals when the vehicle equipped with the wireless terminal MT travels from the point P1 toward the point P5 under the same conditions as those in FIGS. 19 to 24 and selected transmission scheme. As shown in the drawing, from the point P1 to the point P2, the MIMO transmission is selected because of the LOS environment in relation to the TRP #1, and SISO is selected since the NLOS environment occurs at a position when the vehicle has passed the point P2. In the present embodiment, at the point P6 on the way from the point P2 to the point P3, the predicted throughput A2 using the MIMO of the TRP #2 exceeds the throughput A1 of the TRP #1, and switching to the TRP #2 is performed. As a result, the wireless terminal MT can perform MIMO communication in the LOS environment from the point P6 to the point P4 at which a next NLOS environment occurs, and the throughput can be prevented from being dropped.

As described above, according to the present exemplary embodiment, when it is determined that MIMO transmission of another TRP can improve throughput during SISO transmission in a certain TRP, switching of a TRP can be performed quite promptly.

In the exemplary embodiment described above, it is described that the measured throughput A1 of the TRP #1 and the predicted throughput A2 are simply compared, but various modifications can be made. For example, the comparison formula in step S003 in FIG. 8 may be set to A1<A2+α. Here, α is an offset value for TRP determination. By setting α to a negative value, it is possible to prompt to switch to the TRP #2 more quickly. Further, for example, the comparison formula in step S003 in FIG. 8 may be set to A1<A2×β. Here, any correction coefficient can be set as β. By setting the correction coefficient to a value exceeding 1, it is possible to prompt to switch to the TRP #2 more quickly. It is also preferable to set the probability value in the second table of FIG. 6 as β. By doing so, it is possible to calculate the predicted throughput A2 in consideration of the probability of shifting to the combination of each beam and the transmission scheme, and to compare it with the measured throughput.

Further, in the above-described exemplary embodiment, the calculation method of the predicted throughput is described as using the statistics of the measured throughput. However, the calculation method of the throughput is not limited to this. For example, a value obtained by multiplying a measured value of the throughput by the reciprocal of the wireless resource usage rate may be used as the predicted throughput. When video data or the like is transmitted at a constant transmission rate, if the average thereof is employed as the predicted throughput, it will be less than the throughput that can be achieved. By using a value obtained by multiplying the measured value of the throughput by the reciprocal of the wireless resource usage rate, it becomes possible to make a determination of switching of a TRP using a more accurate predicted throughput.

In addition, the throughput may be calculated using a theoretical throughput calculation formula. Here, in the following equation, m is a user ID, n is a beam ID, B is a bandwidth, K is the number of connected users, and $Y_{m,n}$ is an SN ratio.

$$C_{m,n} = (B/K) \times \log_2(1+Y_{m,n})$$ [Formula 1]

Second Exemplary Embodiment

Next, a second exemplary embodiment in which the calculation of the predicted throughput of the first embodiment is modified will be described in detail with reference to the drawings. The second exemplary embodiment is the same as the first exemplary embodiment except that a prediction formula obtained by a multiple regression analysis is used for the calculation of the predicted throughput in the base station apparatus 100 of the first exemplary embodiment. Hereinafter, the difference will be mainly described.

In the second exemplary embodiment, using information reported from the wireless terminal 400 and information held on a side of the base station apparatus 100, a reception power (SN ratio) of a beam (RS), the number of connected users, and an actual value of a throughput are stored for a combination of a transmission scheme of each beam. Then, using a multiple regression analysis or the like, a prediction formula for a prediction throughput is derived for each transmission scheme from the accumulated data. From the viewpoint of improving the accuracy, it is preferable that a derivation period of the prediction formula (an accumulation period of learning data) be sufficiently longer than a calculation period (update period) of the predicted throughput.

Then, the base station apparatus 100 of the present exemplary embodiment calculates a predicted throughput by substituting the received power (SN ratio) of the beam (RS) reported from the wireless terminal 400 and the number of connected users grasped on the base station side into a prediction formula.

FIG. 11 is a diagram illustrating an example of information stored in a second table of the transmission scheme history DB 302 of the base station apparatus according to the second exemplary embodiment of the present invention. The difference from the second table shown in FIG. 6 is that a predicted value calculated using a prediction formula is held as the predicted throughput. Here, $F_1$ ($R_{YY}$, $N_{YY}$) indicates a predicted throughput obtained from a prediction formula from a received power (SN ratio) of a beam YY and the number of connected users $N_{YY}$. Similarly, $F_2$ ($R_{Y1}$, $R_{Y2}$, $N_{Y1}$, $N_{Y2}$) indicates a predicted throughput obtained from a prediction formula from received powers (SN ratio) of beams Y1, Y2 and the number of connected users $N_{Y1}$, $N_{Y2}$.

In the above description, a first prediction formula $F_1$ ($R_{YY}$, $N_{YY}$) is used for SISO transmission, and a second prediction formula $F_2$ ($R_{Y1}$, $R_{Y2}$, $N_{Y1}$, $N_{Y2}$) is used for MIMO transmission. However, a prediction formula may be created as needed. For example, the prediction accuracy can be improved by creating a prediction formula for each TRP or each of conditions that affect the throughput.

Figure 12:
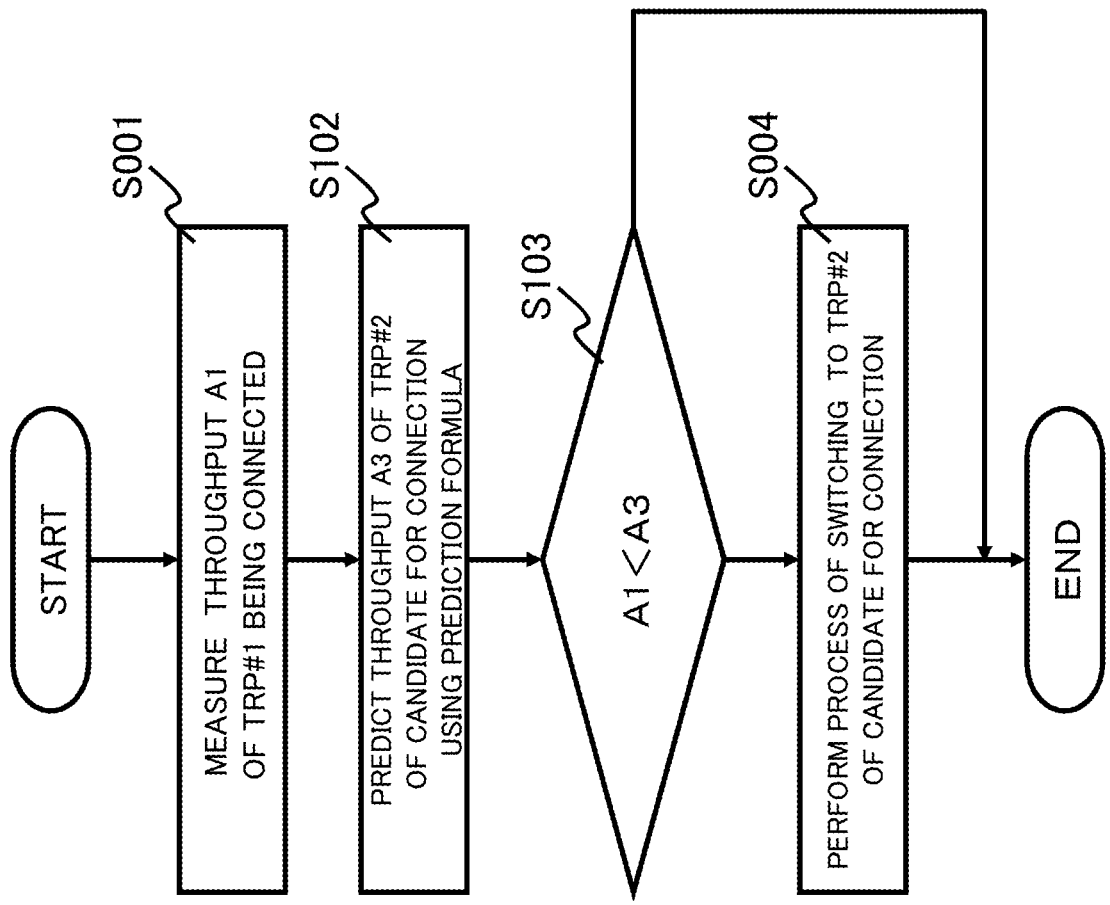
FIG. 12 illustrates a flow diagram of an operation of the base station apparatuses according to the second exemplary embodiment of the present invention.

Subsequently, the operation of the present exemplary embodiment will be described in detail with reference to the drawings. FIG. 12 is a flow diagram of an operation of the base station apparatus according to the second exemplary embodiment of the present invention. First, the base station apparatus 100 measures a throughput A1 of the TRP #1 to which the wireless terminal 400 as a subject for determination of switching of the TRP is being connected (step S001). This process is the same as that in the first exemplary embodiment.

Next, the base station apparatus 100 predicts a throughput A3 of the TRP #2 that is a candidate for connection of the wireless terminal 400 (step S102). Concretely, the base station apparatus 100 updates the contents of the second table using the above-described prediction formula and reads out the predicted throughput A3 of the corresponding beam and the transmission scheme. In the present exemplary embodiment, the combination of the TRP and the beam to be the candidate for connection can also be identified from the beam layout information set in advance or the reception power of each beam reported from the wireless terminal 400. When there are a plurality of candidates for connection, two or more predicted throughputs A3 may be read out.

Next, the base station apparatus 100 compares the throughput A1 measured in step S001 with the predicted throughput A3 predicted in step S102 (step S103). Here, when there are two or more predicted throughputs A3 read out in step S102, the largest one may be used. As a result of this comparison, when the predicted throughput A3 is greater than the throughput A1 (Yes in step S103), the base station apparatus 100 performs a process of switching to the TRP #2 of the candidate for connection (step S004). Concretely, the base station apparatus 100 selects the beam and the transmission scheme for which the predicted throughput A3 has been calculated, and switches to the TRP #2. On the other hand, when the predicted throughput A3 is less than or equal to the throughput A1 (No in step S103), the base station apparatus 100 halts a determination process without performing the process of switching.

As described above, according to the present exemplary embodiment, it is possible to determine whether or not it is necessary to switch the TRP by using the predicted throughput obtained by using the prediction formula. As compared with the first exemplary embodiment, once the prediction formula is created, there is an advantage that it is possible to appropriately determine as to whether or not it is necessary to switch the TRP by calculating the predicted throughput with a high degree of accuracy even if the reliability of the statistics is low due to a small number of samples of the measured throughput.

Third Exemplary Embodiment

Next, a third exemplary embodiment in which the determination process of switching the TRP of the first exemplary embodiment is changed will be described in detail with reference to the drawings. The third exemplary embodiment is the same as the first exemplary embodiment except that the method of comparing the measured throughput A1 with the predicted throughput A2 in the base station apparatus 100 of the first exemplary embodiment is changed. The differences will be mainly described.

Figure 13:
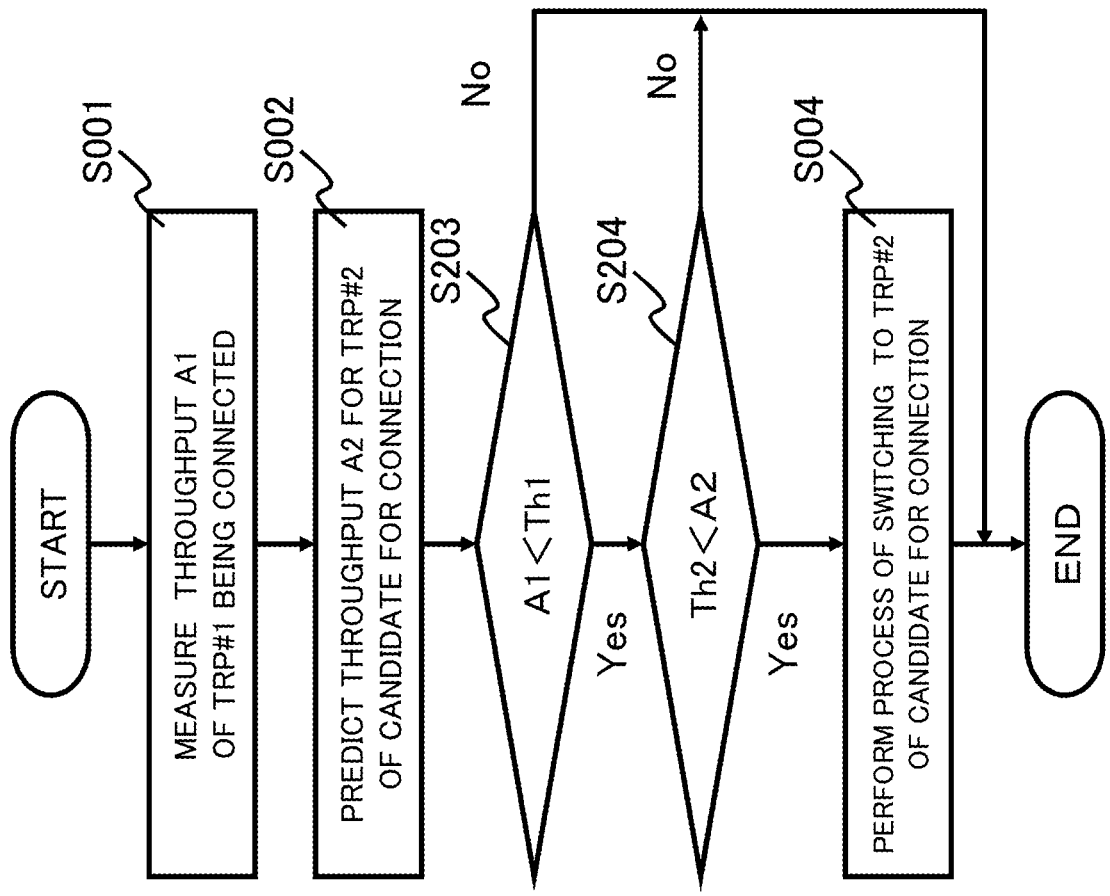
FIG. 13 illustrates a flow diagram of an operation of base station apparatuses according to a third exemplary embodiment of the present invention.

FIG. 13 illustrates a flow diagram of an operation of a base station apparatus according to a third exemplary embodiment of the present invention. First, the base station apparatus 100 measures a throughput A1 of the TRP #1 to which the wireless terminal 400 as a subject for determination of switching of the TRP is being connected (step S001). This process is the same as that in the first exemplary embodiment.

Next, the base station apparatus 100 predicts a throughput A2 of the TRP #2 that can be a candidate for connection of the wireless terminal 400 (step S002). This process is the same as that in the first exemplary embodiment.

Next, the base station apparatus 100 checks whether or not the throughput A1 measured in step S001 is less than a predetermined threshold Th1 (step S203). As a result of this comparison, when the throughput A1 is greater than or equal to the predetermined threshold Th1 (No in step S203), the base station apparatus 100 does not perform the process of switching and halts the determination process because a sufficient throughput has been obtained.

Next, the base station apparatus 100 checks whether or not the throughput A2 predicted in step S002 exceeds a threshold Th2 that is greater than the threshold Th1 (step S204). As a result of the comparison, when the throughput A2 is less than or equal to the threshold Th2 (No in step S204), the base station apparatus 100 halts the determination process without performing the process of switching. This is because the fact that the throughput A2 is less than or equal to the threshold Th2 means that even if the process of the switching is performed, a significant improvement in throughput cannot be expected. Therefore, the threshold value Th2 functions as a throughput value (predetermined guaranteed throughput) guaranteed for the user of the wireless terminal. Then, at this time, the base station apparatus 100 continues the service using the TRP as before regardless of the comparison result between the throughput A2 (predicted throughput) and the throughput A1 (measured throughput).

On the other hand, when the throughput A1 is less than the threshold Th1 and the throughput A2 is greater than the threshold Th2, the base station apparatus 100 executes the process of switching to the TRP #2 that is a candidate for connection. (step S004).

As described above, according to the present exemplary embodiment, the process of switching can be performed when there is an effect of improvement for the throughput greater than or equal to a predetermined value (Th2−Th1). Further, according to the present exemplary embodiment, it is possible to prevent excessive occurrence (hunting) of the process of switching when the user stays at a position where the throughput A1 and the throughput A2 have close values (to one another).

Fourth Exemplary Embodiment

Next, a fourth exemplary embodiment in which the calculation method of the predicted throughput of the first exemplary embodiment is changed will be described in detail with reference to the drawings. The fourth exemplary embodiment is different from the first exemplary embodiment in that the calculation of the predicted throughput in the base station apparatus 100 of the first exemplary embodiment is performed in consideration of a direction of movement of the wireless terminal. Further, the fourth exemplary embodiment is the same as the first exemplary embodiment except that the base station apparatus according to the fourth exemplary embodiment selects an appropriate prediction throughput according to an actual direction of movement of the wireless terminal and determines whether or not a process of switching is necessary. Therefore, the differences will be mainly described below.

FIG. 14 illustrates an example of a first table(s) held in a base station apparatus according to a fourth exemplary embodiment. Compared with the first table of the first exemplary embodiment shown in FIG. 4, a field of immediately preceding transmission scheme is added. Then, a measured throughput by a particular transmission scheme is distinguished by $C_{X\_Z}$ using the suffix z by the immediately preceding transmission scheme. For example, for the wireless terminal 400 that is SISO-connected by a beam 7, a measured throughput is not recorded uniformly, but a measured throughput is individually recorded according to a beam selected immediately before that. A direction in which the wireless terminal 400 has moved is indicated by on which side the beam selected immediately before is located relative to the position of the beam 7.

FIG. 15 illustrates an example of a second table according to the fourth exemplary embodiment. In the example of FIG. 15, among the first tables, the predicted throughput created from the first table of the TRP #2 is managed for each immediately preceding transmission scheme. This predicted throughput is the same as that of the first exemplary embodiment in that statistics such as an average, a mode, and a median of values of the measured throughput field in the first table are set as the predicted throughput but different from it in that it is summed up for each immediately preceding transmission scheme, that is, for each direction of movement of the wireless terminal.

The basic operation of the fourth exemplary embodiment is the same as that of the first exemplary embodiment but differs in the following points. Concretely, when predicting the throughput of the TRP #2 which is a candidate for connection of the wireless terminal 400 in step S002 of FIG. 8, the prediction is performed by using an entry in the second table for which the current transmission scheme, under which the wireless terminal 400 is currently being connected to, matches an immediately preceding transmission scheme. For example, when the beam 24 of the TRP #2 is a candidate for connection, the base station apparatus 100 updates the entry matching with the current transmission scheme (including the currently selected beam) among the SISO entries for the beam 24 in the second table shown in FIG. 15 and read out it.

According to the present exemplary embodiment, it is possible to make the determination of switching a TRP based on a predicted throughput that takes into account that the LOS/NLOS changes depending on the direction of movement even for the same beam.

Fifth Exemplary Embodiment

Next, a fifth exemplary embodiment in which a change is made to a determination process of switching the TRP of the first exemplary embodiment will be described in detail with reference to the drawings. The fifth exemplary embodiment is different from that of the first exemplary embodiment in that a target of a comparison with the measured throughput A1 in the base station apparatus 100 of the first exemplary embodiment includes not only a candidate for connection of other TRP but also a candidate for connection of the TRP currently being connected. The other points are the same as those of the first exemplary embodiment, and the following description will focus on the differences.

Figure 16:
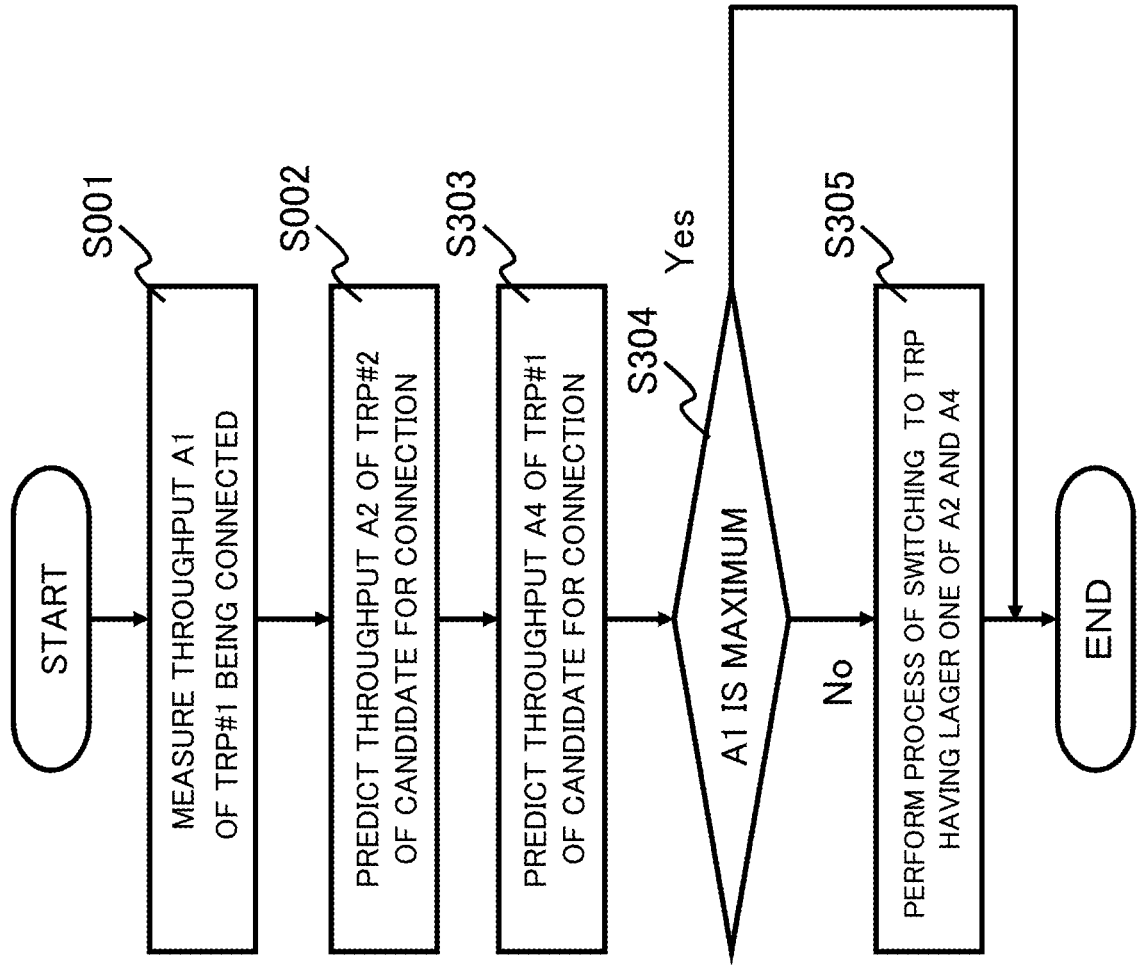
FIG. 16 illustrates a flow diagram of an operation of base station apparatuses according to a fifth exemplary embodiment of the present invention.

FIG. 16 illustrates a flow diagram of an operation of the base station apparatus according to a fifth exemplary embodiment of the present invention. First, the base station apparatus 100 measures a throughput A1 of a TRP #1 to which the wireless terminal 400 as a target for determination of switching the TRP is being connected (step S001). This process is the same as that in the first exemplary embodiment.

Next, the base station apparatus 100 predicts a throughput A2 of a TRP #2 that can be a candidate for connection of the wireless terminal 400 (step S002). This process is the same as that in the first exemplary embodiment.

Next, the base station apparatus 100 predicts a throughput A4 (second predicted throughput) of a candidate for connection of the TRP #1 currently being connected to the wireless terminal 400 (step S303). The throughput A4 (second predicted throughput) of the candidate for connection of the TRP #1 can be calculated in the same manner as the predicted throughput of the TRP #2. Note that the candidate for connection of the TRP #1 can be identified from beam layout information set in advance or a received power of each beam reported from the wireless terminal 400.

Next, the base station apparatus 100 compares the throughput A1 measured in step S001 with the throughputs A2 and A4 predicted in steps S002 and S303 (step S304). As a result of this comparison, when the throughput A1 is maximum (Yes in step S304), the base station apparatus 100 halts the determination process without performing the process of switching because a sufficient throughput has been obtained.

Next, the base station apparatus 100 selects greater one of the throughput A2 and the throughput A4, and performs a process of switching to the TRP, a beam, and a transmission scheme corresponding to the throughput (step S305).

As described above, according to the present exemplary embodiment, an appropriate process of switching can be performed when the current TRP can maintain a greater throughput than that obtained when switching to another TRP be performed. Such a case is unlikely to occur in a case where the wireless terminal MT moves away linearly from the TRP #1 as shown in FIG. 10. However, for example, when the vehicle equipped with the wireless terminal MT changes the traveling direction at a position near the boundary of the TRP, the method of the present exemplary embodiment is considered to improve the throughput.

Sixth Exemplary Embodiment

Figure 17:
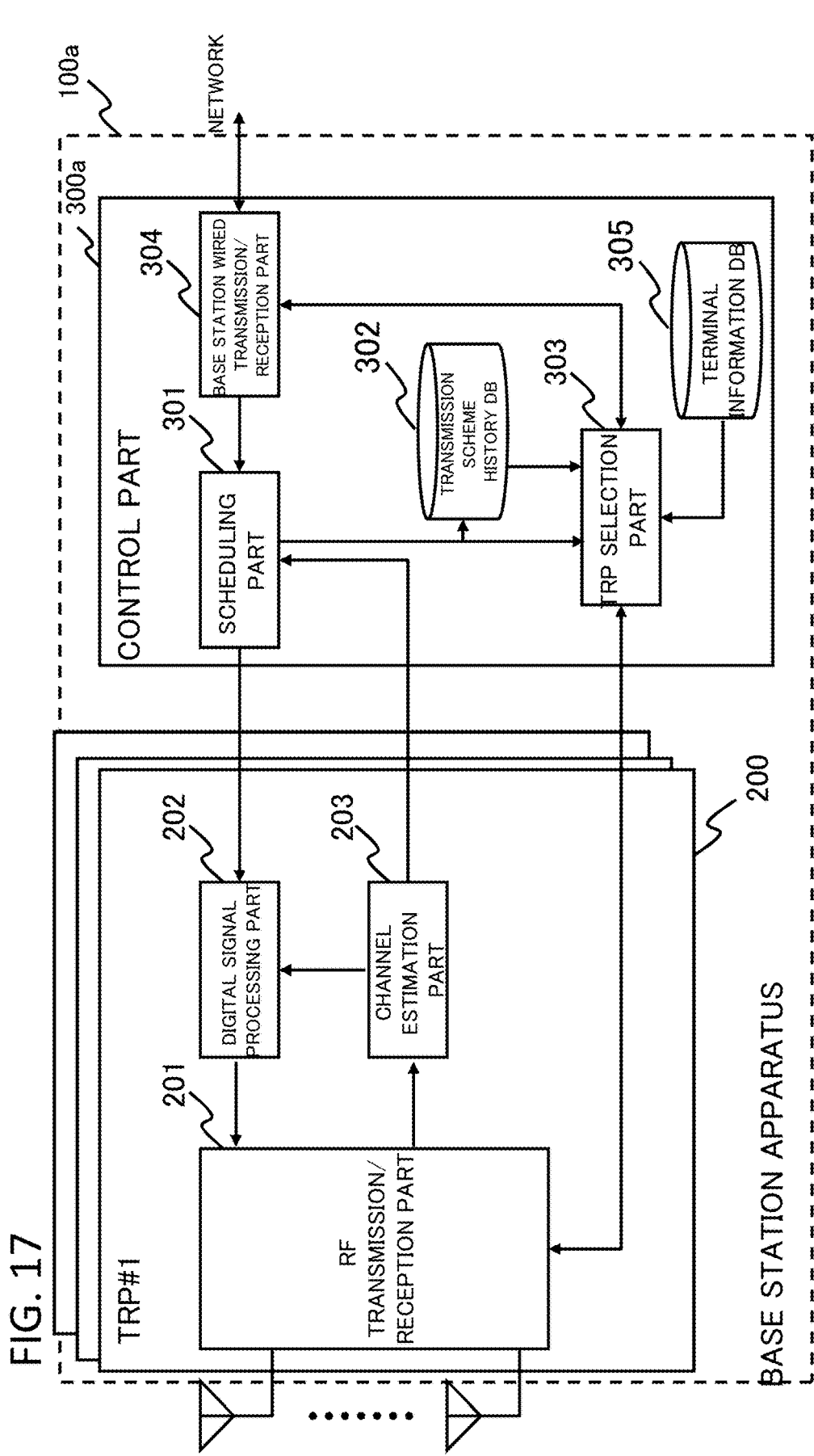
FIG. 17 illustrates a configuration of a base station apparatus according to a sixth exemplary embodiment of the present invention.
Figure 18:
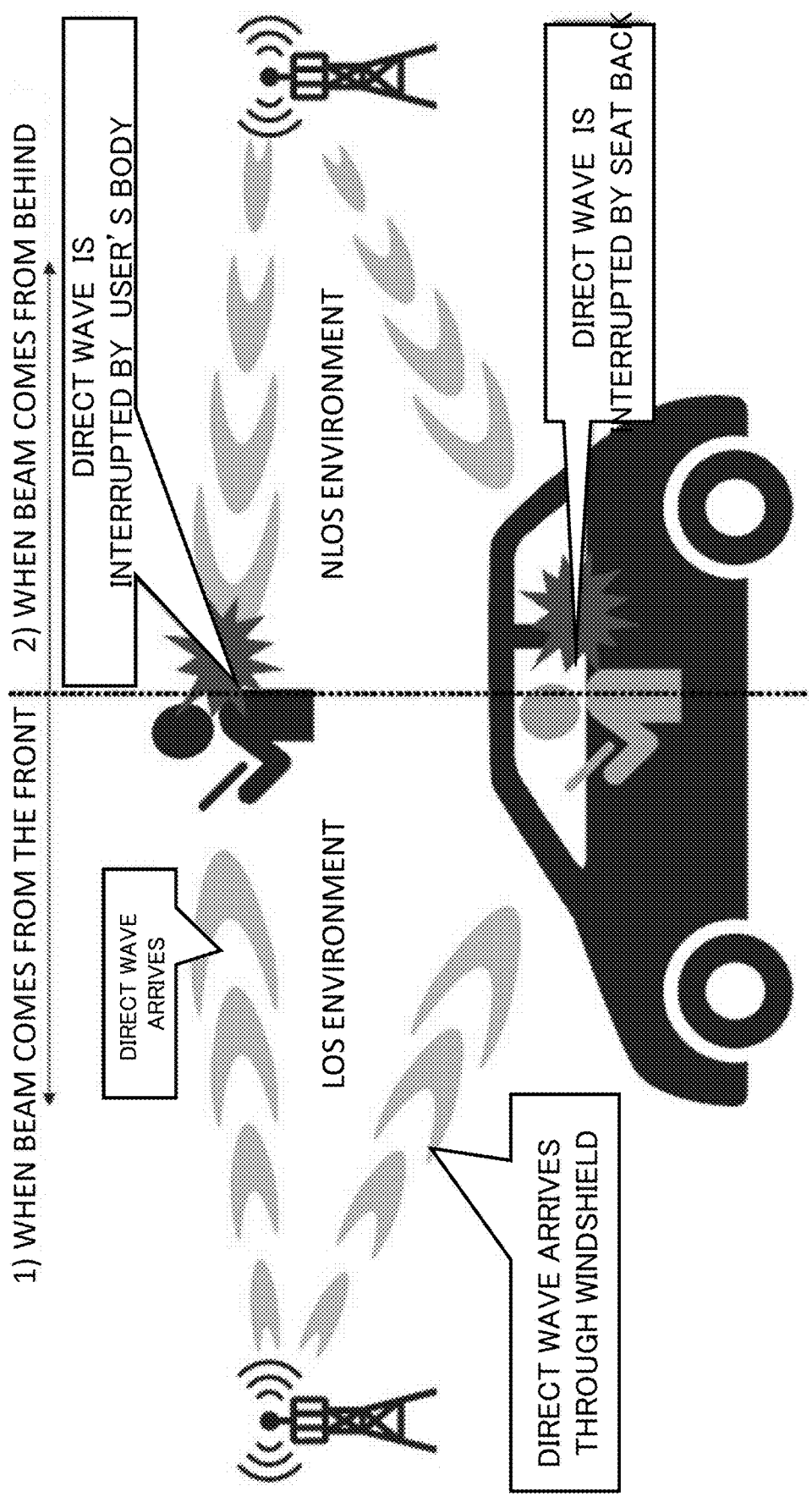
FIG. 18 illustrates a characteristics of a high frequency band communication.

Next, a sixth exemplary embodiment in which a calculation method of the predicted throughput of the TRP of the first exemplary embodiment is changed will be described in detail with reference to the drawings. FIG. 17 illustrates a configuration of the base station apparatus according to a sixth exemplary embodiment of the present invention. The difference from the base station apparatus 100 of the first exemplary embodiment shown in FIG. 3 resides in that a base station apparatus 100a includes a terminal information database (terminal information DB) 305.

The terminal information DB 305 stores, for example, specification information such as the number of antennas of each wireless terminal and supported transmission schemes. In addition, as the terminal information DB, terminal information arranged on the base station side in mobile edge computing and application information linked to terminal specifications and functions that are not dedicatedly provided for determination of switching a TRP can be used.

Other basic operations are the same as those of the first to fifth exemplary embodiments. However, in this exemplary embodiment, the base station apparatus 100a calculates the measured throughput and the predicted throughput in consideration of the specifications of the wireless terminal 400. For example, when the throughput of the wireless terminal 400 that performs MIMO transmission with two antennas is X, the throughput of the wireless terminal 400 with four antennas is calculated as X×γ. Here, γ is a throughput correction coefficient due to an increase in the number of antennas.

According to the present exemplary embodiment for calculating the throughput as described above, it is possible to determine switching timing of the TRP in consideration of the specifications of the wireless terminal. For example, in the first exemplary embodiment, switching to MIMO is performed at a point 290 m from the origin, but in the present exemplary embodiment, it becomes possible that a wireless terminal with four antennas switches to MIMO before 290 m.

As described above, each of exemplary embodiments of the present invention has been described. However, the present invention is not limited to the above-described exemplary embodiments, and further modifications, substitutions, and adjustments made without departing from the basic technical concept of the present invention can be added to. For example, the network configuration, the configuration of each element, and the expression form of a message illustrated in each drawing are examples for helping the understanding of the present invention and are not limited to the configurations illustrated in these drawings. In the following description, "A and/or B" is used to mean at least one of A or B.

Figure 25:
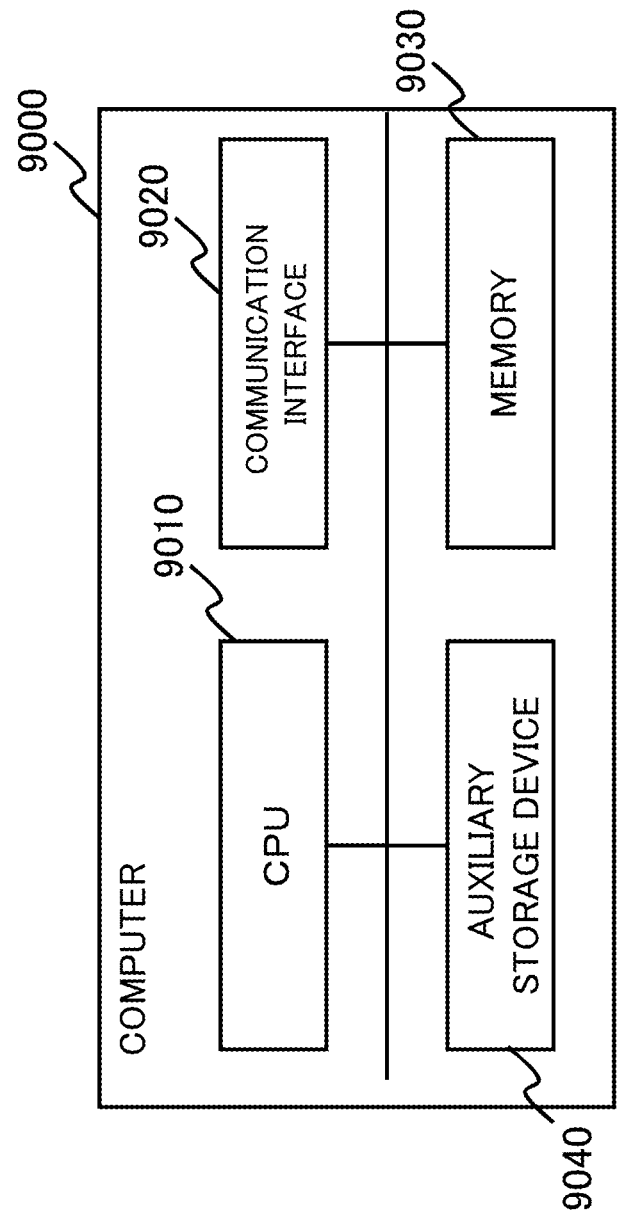
FIG. 25 illustrates a configuration of a computer mounted on the base station of the present invention.

Further, the procedure described in the first to sixth exemplary embodiments can be achieved by a program that causes a computer (9000 in FIG. 25) functioning as the control part 300/300a of the base station apparatus 100/100a to perform a function as the base station apparatus 100/100a. Such a computer is exemplified by a configuration including a CPU (Central Processing Unit) 9010, a communication interface 9020, a memory 9030, and an auxiliary storage deice 9040 in FIG. 25. That is, the CPU 9010 in FIG. 25 may execute a region-division program or a position-estimation program and update each calculation parameter stored in the auxiliary storage device 9040 or the like.

That is, each part (processing means, function) of the base station apparatus 100/100a shown in the above-described first to sixth exemplary embodiments can be realized by a computer program that causes the processor mounted on the apparatus to perform each process using its hardware.

Finally, preferred exemplary embodiments of the present invention are summarized.

[Mode 1]

(Refer to the base station apparatus from the first aspect.)

[Mode 2]

The calculation part of the base station apparatus can calculate the predicted throughput using a measured throughput of other wireless terminal that has received service by using one or more beams of the second transmission/reception point that can be a candidate for selection by said wireless terminal.

[Mode 3]

The calculation part of the base station apparatus can also calculate, as the predicted throughputs, a plurality of types of throughputs obtained by a different combination of the beam and the transmission scheme by means of which the second transmission/reception point transmits, and wherein said transmission/reception point selection part can use a maximum throughput among said throughputs as the predicted throughput.

[Mode 4]

The calculation part of the base station apparatus can also calculate the predicted throughput using a predetermined prediction formula(s) for calculating the throughput from a reception power of said wireless terminal and the number of connected users of the second transmission/reception point in addition to the measured throughput of other wireless terminal which has received service by using one or more beams of the second transmission/reception point that can be a candidate for selection by said wireless terminal.

[Mode 5]

It is also preferable that the transmission/reception point selection part of the base station apparatus continues the service by the first transmission/reception point regardless of a result of comparison with the measured throughput when the prediction throughput does not exceed a predetermined guaranteed throughput.

[Mode 6]

The history recording part of the base station apparatus can also holds probability information representing a probability that other combination of a beam and a transmission scheme is selected when one combination of a beam and a transmission scheme has been selected by the wireless terminal, in addition to the measured throughput by a combination of a beam and a transmission scheme selected by said wireless terminal, and the calculation part can also calculate the predicted throughput by using said probability information.

[Mode 7]

The calculation part of the base station apparatus further can also calculate a second predicted throughput using the measured throughput of other wireless terminal which has received service by means of one or more beams of the first transmission/reception point that can be a candidate for selection of said wireless terminal, and the first transmission/reception point can also provide a service to said wireless terminal by the beam and the transmission scheme that correspond to the second predicted throughput when the second predicted throughput satisfies a predetermined condition.

[Mode 8]

In the base station apparatus, the reception environment comprises whether or not it is a Line Of Sight (LOS) environment, and the base station apparatus may select a MIMO transmission if it is the Line Of Sight (LOS) environment and may select other transmission scheme than MIMO transmission if it is a Non Line Of Sight (NLOS) environment.

[Mode 9]

The transmission/reception point selection part of the base station apparatus can also correct the second throughput according to capability information of the wireless terminal.

[Mode 10]

(Refer to the service provision method from the second aspect.)

[Mode 11]

(Refer to the program from the third aspect.)

The tenth to eleventh modes can be expand to the second to ninth modes as is the case with the first mode.

The disclosures of the above patent literatures are incorporated herein by reference. Modifications and adjustments of the exemplary embodiments or examples are possible within the framework of the entire disclosure (including the claims) of the present invention and based on the basic technical concept thereof. In addition, various combinations of various disclosed elements (including each element of each claim, each element of each exemplary embodiment or example, each element of each drawing, and the like) or selection (including partial deletion) are possible within the scope of the disclosure of the present invention. That is, the present invention of course includes various variations and modifications that could be made by those skilled in the art according to the entire disclosure including the claims and the technical concept. In particular, with respect to the numerical ranges described herein, any numerical values or small range(s) included in the ranges should be construed as being expressly described even if not otherwise specified.

REFERENCE SIGNS LIST 10, 100, 100a base station apparatus
11 calculation part
12 transmission/reception point selection part
13 history recording part
200 TRP
201 RF transmission/reception part
202 digital signal processing part
203 channel estimation part
300, 300a control part
301 scheduling part (resource allocation part)
302 transmission scheme history database (transmission scheme history DB)
303 TRP selection part
304 base station wired transmission/reception part
305 terminal information database (terminal information DB)
400 wireless terminal
401 RF transmission/reception part
402 wireless quality measurement part
403 beam switching determination part
9000 computer
9010 CPU
9020 communication interface
9030 memory
9040 auxiliary storage device

The invention claimed is:

1. A base station apparatus connected to a plurality of transmission/reception points any one of which switches a transmission scheme according to a reception environment of a wireless terminal and provides a service to the wireless terminal, the base station apparatus comprising:
a history recording part that records a measured throughput by a combination of a beam and a transmission scheme selected by said wireless terminal with respect to each of said transmission/reception points;
a calculation part that calculates a predicted throughput when a service by a second combination of a predetermined beam and a second transmission scheme is received from a second transmission/reception point which is different from a first transmission/reception point to which said wireless terminal is being connected; and a transmission/reception point selection part that provides the service from the second transmission/reception point to said wireless terminal by the predetermined beam and the second transmission scheme that correspond to the predicted throughput when a relationship between the measured throughput and the predicted throughput satisfies a predetermined switching condition.

2. The base station apparatus according to claim 1,
wherein said calculation part calculates the predicted throughput using a measured throughput of other wireless terminal that has received service by using one or more beams of the second transmission/reception point that is a candidate for selection by said wireless terminal.

3. The base station apparatus according to claim 1,
wherein said calculation part calculates, as the predicted throughputs, a plurality of types of throughputs obtained by a different combination of the beam and the transmission scheme by means of which the second transmission/reception point transmits, and
wherein said transmission/reception point selection part uses a maximum throughput among said throughputs as the predicted throughput.

4. The base station apparatus according to claim 1,
wherein said calculation part calculates the predicted throughput using a predetermined prediction formula(s) for calculating the throughput from a reception power of said wireless terminal and the number of connected users of the second transmission/reception point in addition to the measured throughput of other wireless terminal which has received service by using one or more beams of the second transmission/reception point that is a candidate for selection by said wireless terminal.

5. The base station apparatus according to claim 1,
wherein said transmission/reception point selection part continues the service by the first transmission/reception point regardless of a result of comparison with the measured throughput when the prediction throughput does not exceed a predetermined guaranteed throughput.

6. The base station apparatus according to claim 1,
wherein said history recording part holds probability information representing a probability that other combination of a beam and a transmission scheme is selected when one combination of a beam and a transmission scheme has been selected by the wireless terminal, in addition to the measured throughput by a combination of a beam and a transmission scheme selected by said wireless terminal, and
wherein said calculation part calculates the predicted throughput by using said probability information.

7. The base station apparatus according to claim 1,
wherein said calculation part further calculates a second predicted throughput using the measured throughput of other wireless terminal which has received service by means of one or more beams of the first transmission/reception point that is a candidate for selection by said wireless terminal, and
wherein the first transmission/reception point provides a service to said wireless terminal by the beam and the transmission scheme that correspond to the second predicted throughput when the second predicted throughput satisfies a predetermined condition.

8. The base station apparatus according to claim 1,
wherein said reception environment comprises whether or not it is a Line Of Sight (LOS) environment, and
a MIMO transmission is selected if it is the Line Of Sight (LOS) environment, and other transmission scheme than MIMO transmission is selected if it is a Non Line Of Sight (NLOS) environment.

9. A service provision method, comprising:
calculating a predicted throughput when a service by a second combination of a predetermined beam and a second transmission scheme is received from a second transmission/reception point that is different from a first transmission/reception point to which a wireless terminal is being connected with reference to a history recording part which records a measured throughput by a combination of a beam and a transmission scheme selected by said wireless terminal with respect to each of a plurality of transmission/reception points which switches the transmission scheme according to a reception environment of a wireless terminal and provides a service to the wireless terminal; and
providing the service from said second transmission/reception point to said wireless terminal by the predetermined beam and the second transmission scheme that correspond to the predicted throughput when a relationship between the measured throughput and the predicted throughput satisfies a predetermined switching condition.

10. The method according to claim 9,
wherein said calculating the predicted throughput is performed by using a measured throughput of other wireless terminal that has received service by using one or more beams of the second transmission/reception point that is a candidate for selection by said wireless terminal.

11. The method according to claim 9,
wherein said calculating the predicted throughput is performed by calculating, as the predicted throughputs, a plurality of types of throughputs obtained by a different combination of the beam and the transmission scheme by means of which the second transmission/reception point transmits, and
wherein said providing the service is performed by using a maximum throughput among said throughputs as the predicted throughput.

12. The method according to claim 9,
wherein said calculating the predicted throughput is performed by using a predetermined prediction formula(s) for calculating the throughput from a reception power of said wireless terminal and the number of connected users of the second transmission/reception point in addition to the measured throughput of other wireless terminal which has received service by using one or more beams of the second transmission/reception point that is a candidate for selection by said wireless terminal.

13. The method according to claim 9,
wherein said providing the service is continued by the first transmission/reception point regardless of a result of comparison with the measured throughput when the prediction throughput does not exceed a predetermined guaranteed throughput.

14. The method according to claim 9,
wherein said history recording part holds probability information representing a probability that other combination of a beam and a transmission scheme is selected when one combination of a beam and a transmission scheme has been selected by the wireless terminal, in addition to the measured throughput by a combination of a beam and a transmission scheme selected by said wireless terminal, and wherein said calculating the predicted throughput is performed by using said probability information.

15. A computer-readable non-transitory recording medium recording a program, the program, causing a computer mounted on a base station apparatus to perform processes of:

calculating a predicted throughput when a service by a second combination of a predetermined beam and a second transmission scheme is received from a second transmission/reception point that is different from a first transmission/reception point to which a wireless terminal is being connected with reference to a history recording part which records a measured throughput by a combination of a beam and a transmission scheme selected by said wireless terminal with respect to each of a plurality of transmission/reception points which switches the transmission scheme according to a reception environment of a wireless terminal and provides a service to the wireless terminal; and providing the service from said second transmission/reception point to said wireless terminal by the predetermined beam and the second transmission scheme that correspond to the predicted throughput when a relationship between the measured throughput and the predicted throughput satisfies a predetermined switching condition.

16. The medium according to claim 15,
wherein said process of calculating the predicted throughput is performed by using a measured throughput of other wireless terminal that has received service by using one or more beams of the second transmission/reception point that is a candidate for selection by said wireless terminal.

17. The medium according to claim 15,
wherein said process of calculating the predicted throughput is performed by calculating, as the predicted throughputs, a plurality of types of throughputs obtained by a different combination of the beam and the transmission scheme by means of which the second transmission/reception point transmits, and wherein said process of providing the service is performed by using a maximum throughput among said throughputs as the predicted throughput.

18. The medium according to claim 15,
wherein said process of calculating the predicted throughput is performed by using a predetermined prediction formula(s) for calculating the throughput from a reception power of said wireless terminal and the number of connected users of the second transmission/reception point in addition to the measured throughput of other wireless terminal which has received service by using one or more beams of the second transmission/reception point that is a candidate for selection by said wireless terminal.

19. The medium according to claim 15,
wherein said process of providing the service is continued by the first transmission/reception point regardless of a result of comparison with the measured throughput when the prediction throughput does not exceed a predetermined guaranteed throughput.

20. The medium according to claim 15,
wherein said history recording part holds probability information representing a probability that other combination of a beam and a transmission scheme is selected when one combination of a beam and a transmission scheme has been selected by the wireless terminal, in addition to the measured throughput by a combination of a beam and a transmission scheme selected by said wireless terminal, and wherein said process of calculating the predicted throughput is performed by using said probability information.

* * * * *